(12) United States Patent
Aarrestad et al.

(10) Patent No.: US 10,440,322 B2
(45) Date of Patent: *Oct. 8, 2019

(54) AUTOMATED CONFIGURATION OF BEHAVIOR OF A TELEPRESENCE SYSTEM BASED ON SPATIAL DETECTION OF TELEPRESENCE COMPONENTS

(71) Applicant: Cisco Technology, Inc., San Jose, CA (US)

(72) Inventors: Glenn R. G. Aarrestad, Høvik (NO); Lennart Burenius, Oslo (NO); Jochen Christof Schirdewahn, Stabekk (NO); Johan Ludvig Nielsen, Oslo (NO)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/908,988

(22) Filed: Mar. 1, 2018

(65) Prior Publication Data
US 2018/0192002 A1    Jul. 5, 2018

Related U.S. Application Data

(63) Continuation of application No. 15/338,676, filed on Oct. 31, 2016, now Pat. No. 9,942,513.

(51) Int. Cl.
*H04N 7/14* (2006.01)
*H04R 1/40* (2006.01)
*H04N 7/15* (2006.01)

(52) U.S. Cl.
CPC ............. *H04N 7/147* (2013.01); *H04N 7/142* (2013.01); *H04N 7/15* (2013.01); *H04R 1/403* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 5,335,011 A * | 8/1994 | Addeo | H04N 7/15 348/14.1 |
| 7,154,526 B2 | 12/2006 | Foote et al. | |

(Continued)

OTHER PUBLICATIONS

N. Matsuo, et al., "Speaker Position Detection System Using Audio-visual Information", UDC 621.397.3:801.41, Fujitsu Sci. Tech. J., 35, 2, pp. 212-220, Dec. 1999, 9 pages.
(Continued)

*Primary Examiner* — Phung-Hoang J Nguyen
(74) *Attorney, Agent, or Firm* — Edell, Shapiro & Finnan, LLC

(57) ABSTRACT

A system that automatically configures the behavior of the display devices of a video conference endpoint. The controller may detect, at a microphone array having a predetermined physical relationship with respect to a camera, audio emitted from one or more loudspeakers, each loudspeaker having a predetermined physical relationship with respect to at least one of one or more display devices in a conference room. The controller may then generate data representing a spatial relationship between the one or more display devices and the camera based on the detected audio. Finally, the controller may assign video sources received by the endpoint to each of the one or more display devices based on the data representing the spatial relationship and the content of each received video source, and may also assign outputs from multiple video cameras to an outgoing video stream based on the on the data representing the spatial relationship.

20 Claims, 14 Drawing Sheets

(52) U.S. Cl.
CPC ......... *H04R 1/406* (2013.01); *H04R 2430/20* (2013.01)

(56) References Cited

U.S. PATENT DOCUMENTS

| | | | |
|---|---|---|---|
| 7,949,139 B2* | 5/2011 | McKee Cooper | H04S 7/301 381/58 |
| 8,537,195 B2 | 9/2013 | Duckworth et al. | |
| 8,659,637 B2* | 2/2014 | De Beer | H04N 7/142 348/14.08 |
| 8,797,376 B2 | 8/2014 | Saleh et al. | |
| 9,215,543 B2 | 12/2015 | Sun et al. | |
| 2004/0114772 A1 | 6/2004 | Zlotnick | |
| 2008/0218586 A1* | 9/2008 | Graham | H04L 12/1822 348/14.09 |
| 2013/0272548 A1* | 10/2013 | Visser | G06K 9/00624 381/122 |
| 2014/0160225 A1* | 6/2014 | Baldelli | H04N 7/15 348/14.08 |
| 2014/0240447 A1 | 8/2014 | Cartwright et al. | |
| 2015/0243200 A1 | 8/2015 | Pan | |
| 2016/0065828 A1 | 3/2016 | Lee | |
| 2016/0299014 A1* | 10/2016 | Li | G01K 11/24 |
| 2017/0150099 A1 | 5/2017 | Duckworth et al. | |

OTHER PUBLICATIONS

"RealPresence Group Series", Group Video Conference—Polycom RealPresence Group Conferencing, Polycom, Inc., http://www.polycom.co.in/products-services/hd-telepresence-video-conferencing/realpresence-room/realpresence-group-series.html, downloaded from the internet on Jul. 19, 2016, 16 pages.

Trond F. Bergh, "Speaker Tracking Based on Face Detection and Voice Activity Detection Using a Microphone Array", 2 pages.

* cited by examiner

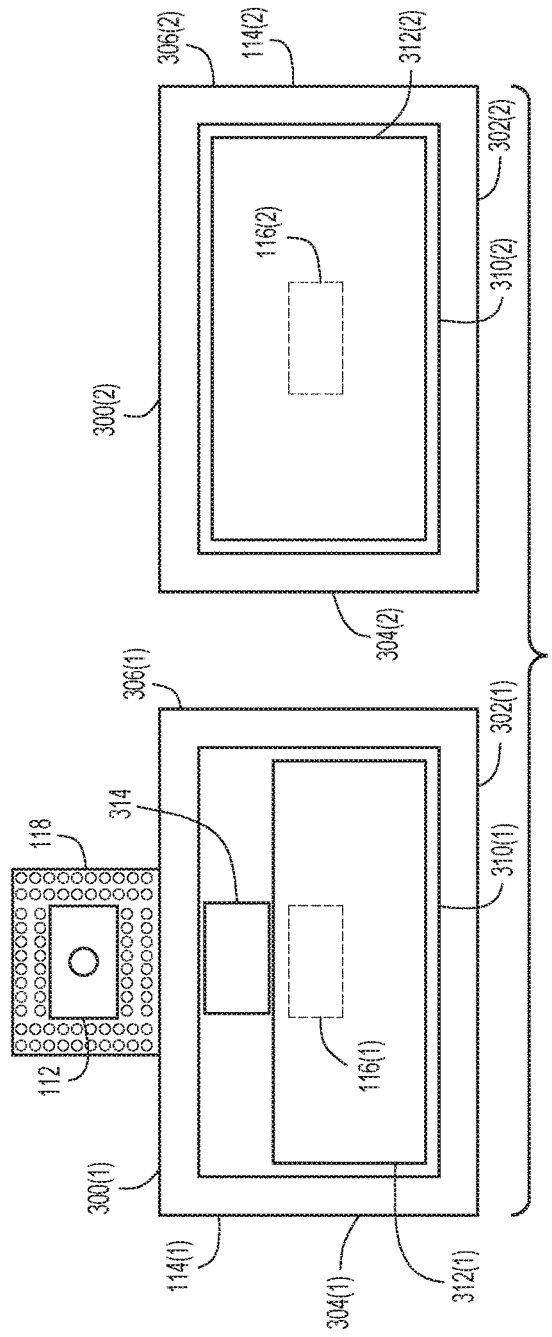
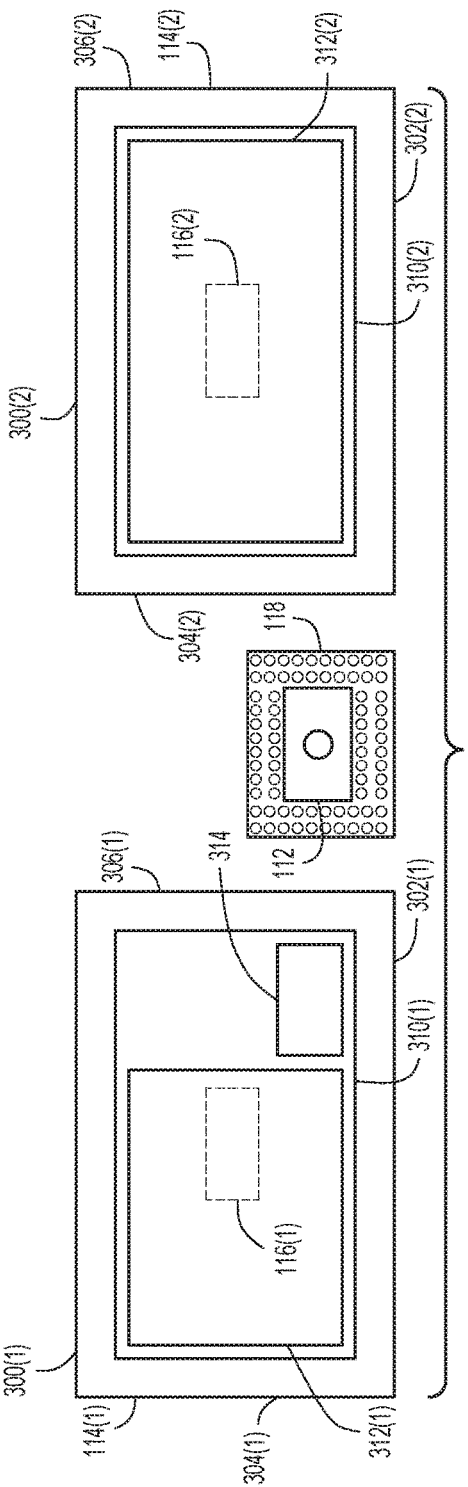

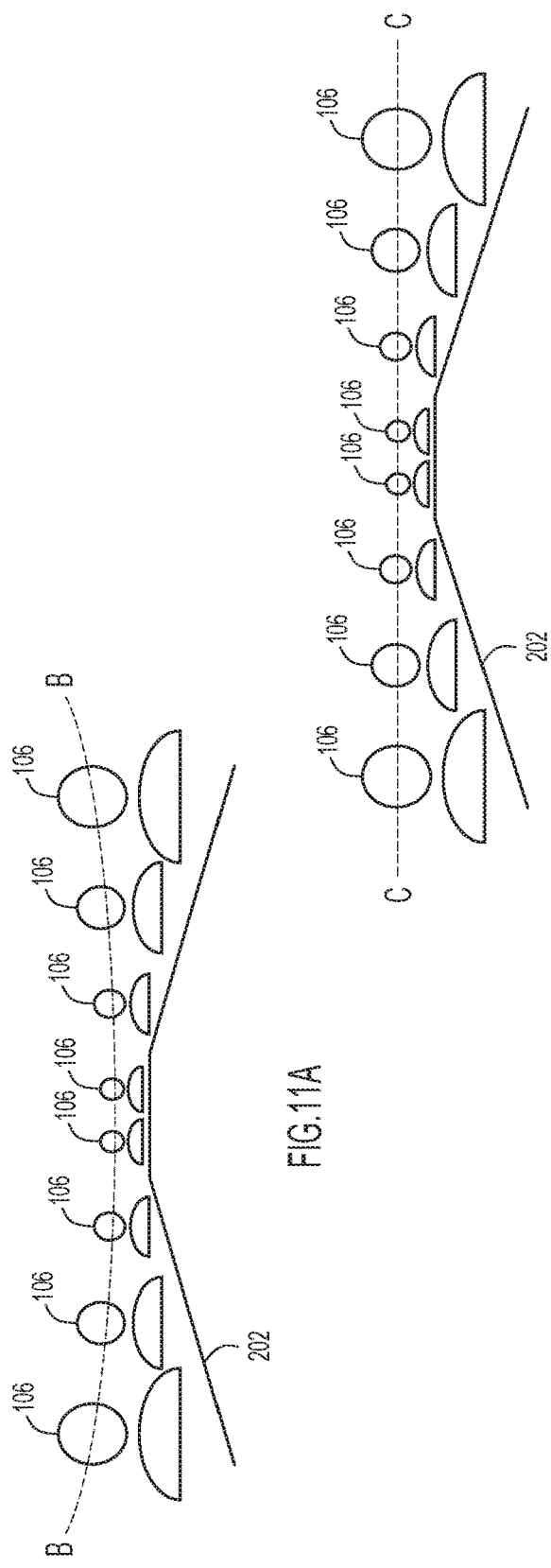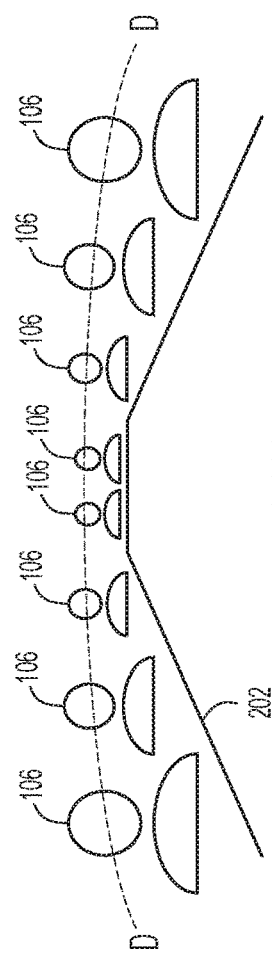

AUTOMATED CONFIGURATION OF BEHAVIOR OF A TELEPRESENCE SYSTEM BASED ON SPATIAL DETECTION OF TELEPRESENCE COMPONENTS

CROSS-REFERENCE TO RELATED APPLICATIONS

This application is a continuation of U.S. patent application Ser. No. 15/338,676, filed on Oct. 31, 2016, and entitled "AUTOMATED CONFIGURATION OF BEHAVIOR OF A TELEPRESENCE SYSTEM BASED ON SPATIAL DETECTION OF TELEPRESENCE COMPONENTS," the entirety of which is incorporated herein by reference.

TECHNICAL FIELD

The present disclosure relates to configuring components of a video conference endpoint in a conference room based on spatial detection of the components.

BACKGROUND

Video conference endpoints are deployed in conference rooms. The conference rooms can differ in size and configuration which affects the layout/placement of the video conference endpoint components in the conference room, and use of the conference room. The placement of the components within the conference room, such as the relationship and placement of the display screens with respect to the camera(s), affects the experience of participants of a conference session within the conference room. Because no two conference rooms are the same size and shape, a standard layout for a conference room is not possible. This results in different placements of the camera(s) with respect to the display screens of a conference room. Typically, an operator has to manually select which display screen is to receive specific video sources, including which display screen, or portion of a display screen, is to display the live video stream of the participants of the conference session that are present at another video conference endpoint. Such manual selection is cumbersome and inconvenient, and often does not place the live video stream of participants of the conference session from another video conference endpoint at a position that maximizes eye contact between participants at separate video conference endpoints.

BRIEF DESCRIPTION OF THE DRAWINGS

FIG. 4A is a front view of a plurality of display devices of a video conference endpoint where the integrated camera and microphone array are disposed above one of the display devices, according to an example embodiment.

FIG. 4B is a front view of a plurality of display devices of a video conference endpoint where the integrated camera and microphone array are disposed between the display devices, according to an example embodiment.

FIG. 11A is an illustration of a table and a plurality of detected faces within a conference room from the viewpoint of a camera integrated with a video conference endpoint where the camera is mounted below a display device, according to an example embodiment.

FIG. 11B is another illustration of a table and a plurality of detected faces within a conference room from the viewpoint of a camera integrated with a video conference endpoint of where the camera is mounted at the same height as a display device, according to an example embodiment.

FIG. 11C is an illustration of a table and a plurality of detected faces within a conference room from the viewpoint of a camera integrated with a video conference endpoint of where the camera is mounted above a display device, according to an example embodiment.

DESCRIPTION OF EXAMPLE EMBODIMENTS

Overview

Techniques presented herein relate to automatically configuring the one or more display devices of a video conference endpoint based on spatial detection of the components of the video conference endpoint and the content of the video sources received by the video conference endpoint. The video conference endpoint may include one or more display devices, one or more loudspeakers having a predetermined physical relationship with respect to at least one of the one or more display devices, at least one camera, a microphone array having a predetermined physical relationship with respect to the camera, and a controller. The controller may be configured to detect, at a microphone array having a predetermined physical relationship with respect to a camera, the audio emitted from each of one or more loudspeakers, each loudspeaker having a predetermined physical relationship with respect to at least one of one or more display devices in a conference room. The controller may further be configured to generate data representing a spatial relationship between each of the one or more display devices and the camera based on the detected audio.

Example Embodiments

Figure 1:
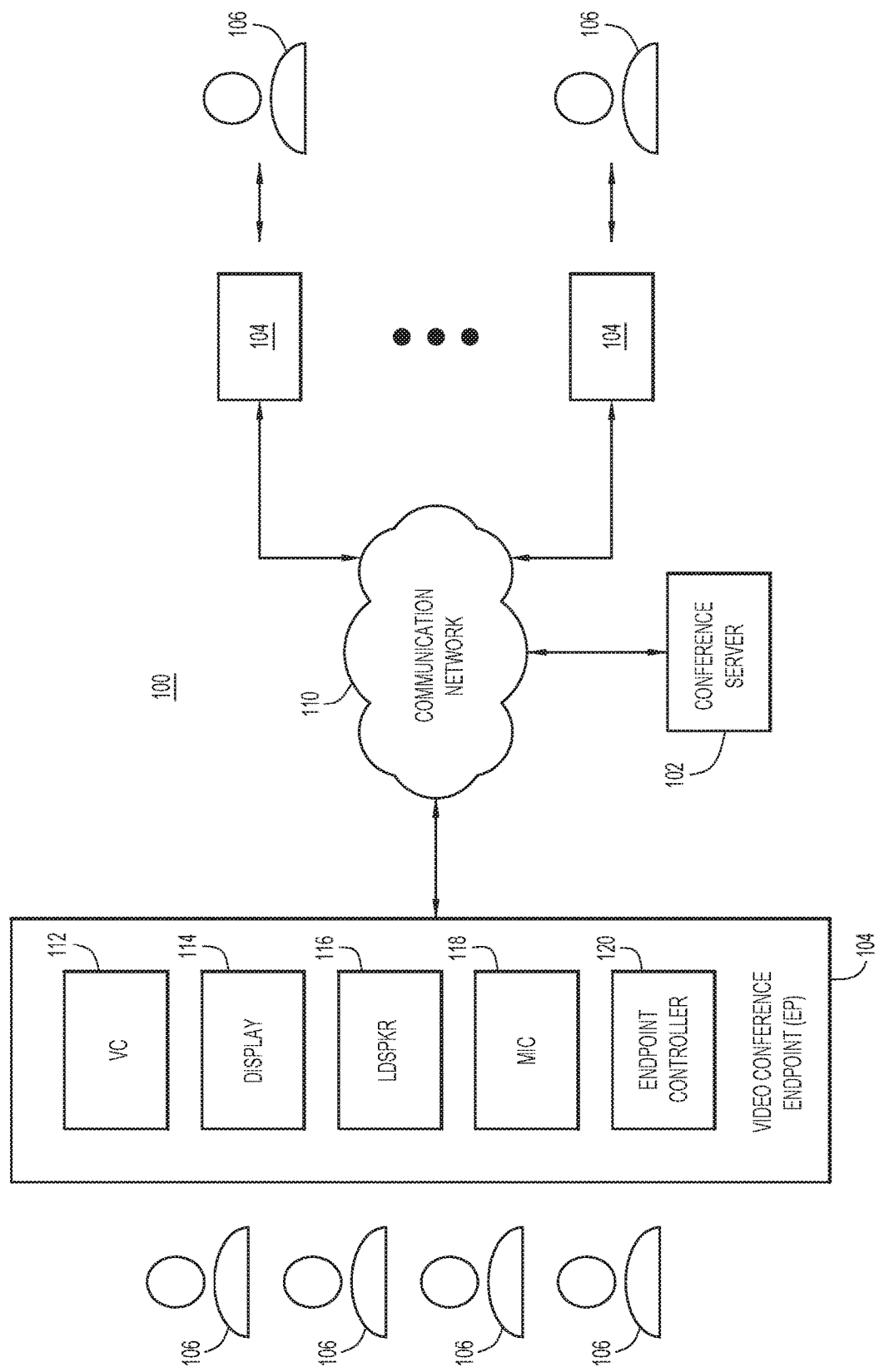
FIG. 1 is a block diagram of an example video conference (e.g., teleconference) system in which techniques to automatically configure the behavior of various components within the environment based on spatial detection may be implemented, according to an example embodiment.

With reference to FIG. 1, there is depicted a block diagram of a video conference (e.g., teleconference) system 100 in which automatic configuration of the behavior of the display devices of the system 100 based on spatial detection may be implemented, according to an example embodiment. Video conference system 100 includes video conference endpoints 104 operated by local users/participants 106 and configured to establish audio-visual teleconference collaboration sessions with each other over a communication network 110. Communication network 110 may include one or more wide area networks (WANs), such as the Internet, and one or more local area networks (LANs). A conference server 102 may also be deployed to coordinate the routing of audio-video streams among the video conference endpoints.

Each video conference endpoint 104 may include at least one video camera (VC) 112, at least one display device 114, a loudspeaker (LDSPKR) 116 coupled to or integrated with the display device 114, one or more microphones arrays (MIC) 118 coupled to or integrated with the camera 112, and an endpoint controller 120 configured to control the video camera(s) 112, at least one display device 114, the loudspeaker 116, and the one or more microphone arrays 118. In a transmit direction, endpoints 104 capture audio/video from their local participants 106 with video camera 112/microphone array 118, encode the captured audio/video into data packets, and transmit the data packets to other endpoints or to the conference server 102. In a receive direction, endpoints 104 decode audio/video from data packets received from the conference server 102 or other endpoints and present the audio/video to their local participants 106 via display device 114/loudspeaker 116.

Figure 2A:
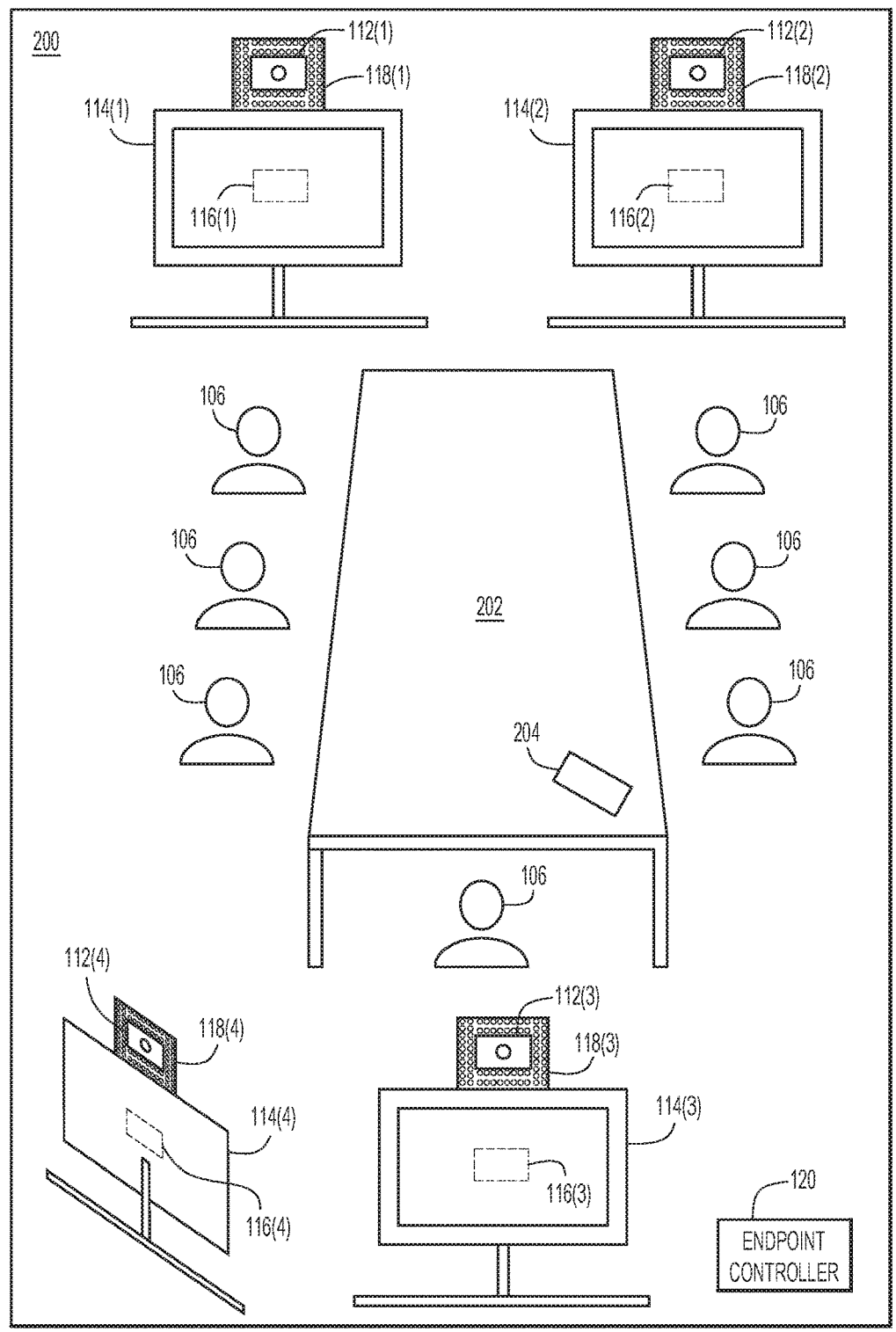
FIG. 2A is an illustration of an example video conference endpoint deployed in a conference room and configured to perform techniques presented herein, according to an example embodiment.

Referring now to FIG. 2A, there is depicted an illustration of video conference endpoint 104 deployed in a conference room 200, according to an embodiment. Video conference endpoint 104 includes a plurality of display devices 114(1)-114(4) positioned around the conference room 200. Display devices 114(1)-114(3) may be screens configured to display content from video sources, while display device 114(4) may be a user-interactive digital display device (e.g., a whiteboard or touch screen). Display devices 114(1)-114(4) may contain a camera 112(1)-112(4), respectively, and a microphone array 118(1)-118(4), respectively, having a predetermined physical relationship with respect to the cameras 112(1)-112(4), respectively. In some embodiments, the microphone arrays 118(1)-118(4) may be integrated with the cameras 112(1)-112(4), respectively. Cameras 112(1)-112(4) are each operated under control of endpoint 104 to capture video of different views or scenes of multiple participants 106 seated around a table 202 opposite from or facing (i.e., in front of) the cameras 112(1)-112(4) (and display devices 114(1)-114(4)). The cameras 112(1)-112(4) depicted in FIG. 2A may be only one example of many possible camera and camera combinations that may be used, as would be appreciated by one of ordinary skill in the relevant arts having read the present description (i.e., combining two video cameras for one display device).

In some forms, the display devices may be separate from one or more cameras, and the microphone arrays may be separate from the display devices and one or more cameras. For example, an end user may use his/her own display devices, and some cameras available in the market are configured to attach to a microphone stand supporting the microphone array. However, even in that situation, the camera will, once attach, have a known predetermined physical relationship with respect to the microphone array. In summary, the various components of an endpoint may be integrated together when sold, or may be configured after purchase to be physically attached to each other so as to have a predetermined physical relationship. Furthermore, the loudspeakers 116(1)-116(4) may have a predetermined physical relationship with respect to the display devices 114(1)-114(4), respectively. In some embodiments, the loudspeakers 116(1)-116(4) may be integrated with the display devices 114(1)-114(4), respectively. While FIG. 2A illustrates the loudspeakers 116(1)-116(4) being disposed centrally on the display devices 112(1)-112(4), it should be appreciated that the loudspeakers 116(1)-116(4) may be disposed in any location within or around the edge/frame of the display devices 112(1)-112(4), including, but not limited to, centrally along the bottom edge of the frame of the display devices 112(1)-112(4), the bottom corners of the display devices 112(1)-112(4), etc. In other embodiments, the loudspeakers 116(1)-116(4) may be attached or mounted in close proximity to the display devices 114(1)-114(4), respectively. Thus, the loudspeakers 116(1)-116(4) are configured to generate audio projected in the same directions that the display devices 114(1)-114(4), respectively, display video content. In other words, the loudspeakers 116(1)-116(4) are integrated with the display devices 114(1)-114(4) such that the audio outputs generated by the loudspeakers 116(1)-116(4) originate from approximately the same location in which the content of the video sources are displayed.

As depicted in the example of FIG. 2A, and as briefly explained above, microphone arrays 118(1)-118(4) are positioned adjacent to, integrated with (or otherwise in a known predetermined physical relationship to), the cameras 112(1)-112(4), respectively. In one embodiment, microphone arrays 118(1)-118(4) may be planar microphone arrays. The combination of the cameras 112(1)-112(4) with the microphone arrays 118(1)-118(4), respectively, may be disposed adjacent to display devices 114(1)-114(4), respectively, enabling the respective microphone arrays 118(1)-118(4) to receive both audio from participants 106 in room 200 and the audio outputs generated by the loudspeakers 116(1)-116(4) of display devices 114(1)-114(4). Each of cameras 112(1)-112(4) may include pan, tilt, and zoom (PTZ) features that may be implemented mechanically and/or digitally.

The video conference endpoint 104 further includes an endpoint user control device 204 disposed within the conference room 200. The endpoint user control device 204 may be movable within the room 200. The endpoint user control device 204 may be a tablet computer, smartphone or other similar device on which an endpoint controller application is installed. The endpoint user control device 204 may be configured to manage each of the display devices 114(1)-114(4), including, but not limited to, the content displayed on each of the display devices 114(1)-114(4). The endpoint user control device 204 may also be configured control the pan, tilt, and zoom the video cameras 112(1)-112(4) (in the mechanical or digital domain) as necessary to capture video of different views that encompass one or more of participants 106.

Video conference endpoint 104 uses (i) audio detection techniques to detect audio sources, i.e., loudspeakers 116(1)-116(4), by the microphone arrays 118(1)-118(4) and to determine the spatial relationship between the cameras 112(1)-112(4), display devices 114(1)-114(4), loudspeakers 116(1)-116(4), and microphone arrays 118(1)-118(4); (ii) face detection techniques to detect faces and associated positions thereof of participants 106 around the table 202; and (iii) object detection techniques to detected the shape of specific and known objects, e.g., the table 202.

In accordance with techniques presented herein, video conference endpoint 104 defines/establishes the spatial relationship between cameras 112(1)-112(4) and display devices 114(1)-114(4), and automatically determines which display device 114(1)-114(4) will display certain video feeds received by the video conference endpoint 104. In support of this, video conference endpoint 104 also defines the probability that an audio source detected by the microphone array 118(1)-118(4) is disposed above, below, to the right of, or to the left of the respective cameras 112(1)-112(4) and the respective microphone arrays 118(1)-118(4), and thus also defines the probability that a display device 114(1)-114(4) is disposed above, below, to the right of, or to the left of the respective cameras 112(1)-112(4) and respective microphone arrays 118(1)-118(4). In certain cases described below, endpoint 104 automatically determines which display device 114(1)-114(4) to display a live video feed of remote participants 106 located at a remote video conference endpoint 104.

Figure 2B:
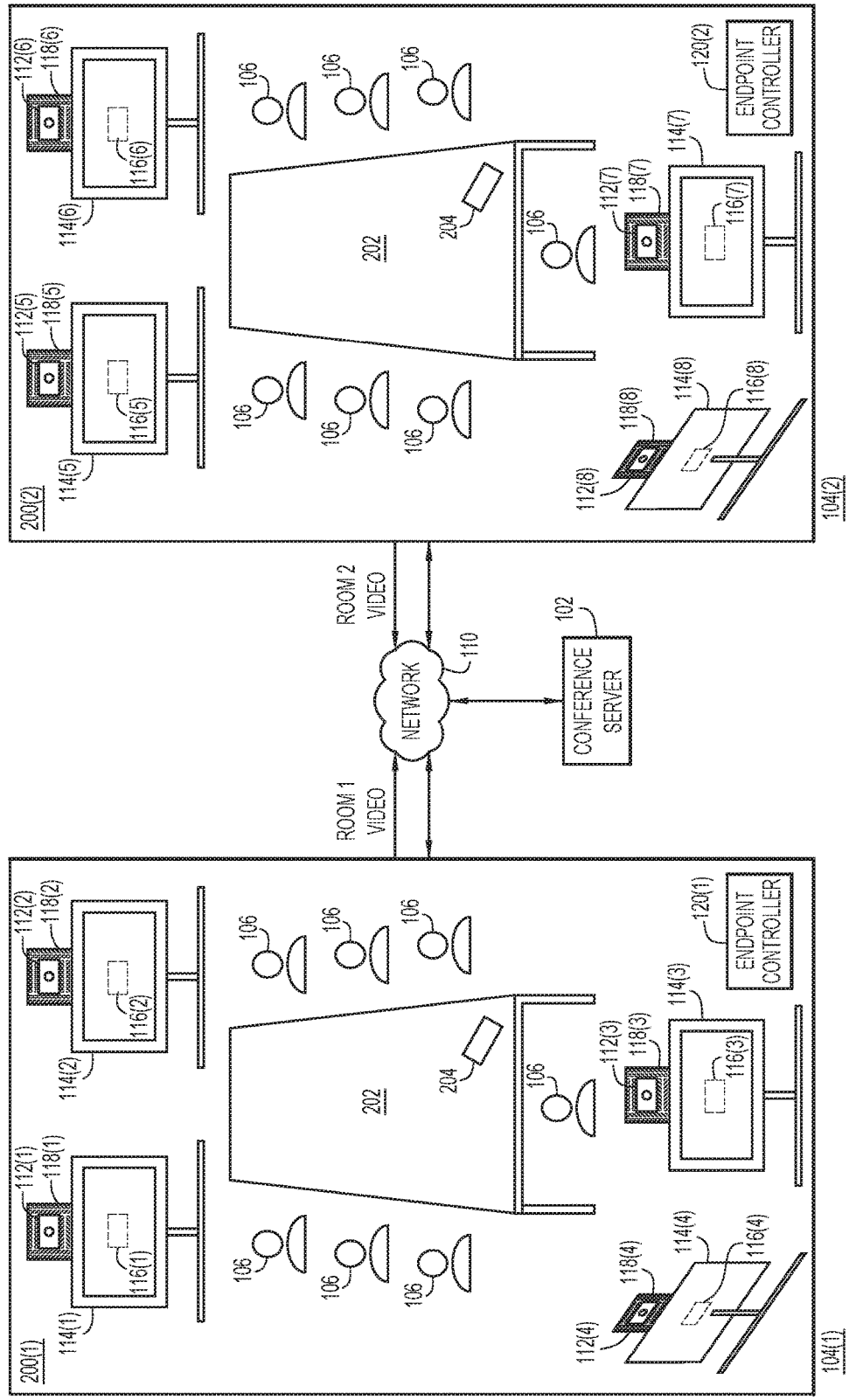
FIG. 2B is an illustration of example video conference endpoints deployed in respective conference rooms and configured to perform techniques presented herein, according to an example embodiment.

Referring now to FIG. 2B, there is depicted an illustration of a first video conference endpoint 104(1) deployed in conference room 200(1) and a second video conference endpoint 104(2) deployed in conference room 200(2), the two conference endpoints 104(1), 140(2) configured to communicate with one another via network 110, according to an embodiment. The first video conference endpoint 104(1) and the second video conference endpoint 104(2) are substantially similar to the video conference endpoint 104 depicted in FIG. 2A.

The first video conference endpoint 104(1) includes a plurality of display devices 114(1)-114(4) positioned around the conference room 200(1). Display devices 114(1)-114(3) may be screens configured to display content from video sources, while display device 114(4) may be a user-interactive digital display device (e.g., a whiteboard or touch screen). Display devices 114(1)-114(4) may contain a camera 112(1)-112(4), respectively, and a microphone array 118(1)-118(4), respectively, integrated with the cameras 112(1)-112(4), respectively. Cameras 112(1)-112(4) are each operated under control of endpoint 104(1) to capture video of different views or scenes of multiple participants 106 seated around a table 202(1) opposite from or facing (i.e., in front of) the cameras 112(1)-112(4) (and display devices 114(1)-114(4)). Furthermore, display devices 114(1)-114(4) may contain an integrated loudspeaker 116(1)-116(4), respectively.

The second video conference endpoint 104(2) includes a plurality of display devices 114(5)-114(8) positioned around the conference room 200(2). Display devices 114(5)-114(7) may be screens configured to display content from video sources, while display device 114(8) may be a user-interactive digital display device (e.g., a whiteboard or touch screen). Display devices 114(5)-114(8) may contain a camera 112(5)-112(8), respectively, and a microphone array 118(5)-118(8), respectively, integrated with the cameras 112(5)-112(8), respectively. Cameras 112(5)-112(8) are each operated under control of endpoint 104(2) to capture video of different views or scenes of multiple participants 106 seated around a table 202(2) opposite from or facing (i.e., in front of) the cameras 112(5)-112(8) (and display devices 114(5)-114(8)). Furthermore, display devices 114(5)-114(8) may contain an integrated loudspeaker 116(5)-116(8), respectively.

As illustrated in FIG. 2B, the first video conference endpoint 104(1) and the second video conference endpoint 104(2) are configured to communicate with each other via network 110. The captured video and audio of the first video conference endpoint 104(1) may be sent to the second video conference endpoint 104(2), where the captured video and audio from the first video conference endpoint 104(1) may be output by the display devices 114(5)-114(8) and the loudspeakers 116(5)-116(8) of the second video conference endpoint 104(2). Conversely, the captured video and audio of the second video conference endpoint 104(2) may be sent to the first video conference endpoint 104(1), where the captured video and audio from the second video conference endpoint 104(2) may be output by the display devices 114(1)-114(4) and the loudspeakers 116(1)-116(4) of the first video conference endpoint 104(1).

As described herein, the video conference endpoint 104(1) may be configured to use data representing the spatial relationship of video conference components generated according to the techniques presented herein to assign video sources contained in an incoming video feed received from video conference endpoint 104(2) to display devices in conference room 200(1), and to assign outputs from a plurality of cameras in conference room 200(1) in an outgoing video feed to be sent to video conference endpoint 104(2) in conference room 200(2). Similarly, video conference endpoint 104(2) may be configured to use data representing the spatial relationship of video conference components generated according to the techniques presented herein to assign video sources contained in an incoming video feed received from video conference endpoint 104(1) to display devices in conference room 200(2), and to assign outputs from a plurality of cameras in conference room 200(2) in an outgoing video feed to be sent to video conference endpoint 104(2) in conference room 200(1).

With reference to FIGS. 3A-3D, depicted is a front view of a display device 114 with the camera 112 and microphone array 118 disposed at various positions around the display device 114. As previously explained, the display device 114 includes a loudspeaker 116 integrated with, coupled to, or mounted in close proximity with the display device 114. In the examples illustrated in FIGS. 3A-3D, the loudspeaker 116 is integrated with the display device 114 such that the loudspeaker 116 may be disposed within the display device 114. While FIGS. 3A-3D illustrate the loudspeaker 116 being disposed centrally on the display device 112, it should be appreciated that the loudspeaker 116 may be disposed in any location within or around the edge/frame of the display device 112, including, but not limited to, centrally along the bottom edge of the frame of the display device 112, the bottom corners of the display device 112, etc. Furthermore, the display device 114 includes a top side 300, a bottom side 302 opposite the top side 300, a first or left side 304, and a second or right side 306 opposite the left side 304. The display device 114 further includes a screen 310, which is configured to display first video content 312 and second video content 314. In one embodiment, first video content 312 may be a presentation (document, slides, etc.), while second video content 314 may be a live video feed of remote participants 106 located at another video conference endpoint 104.

Figure 3A:
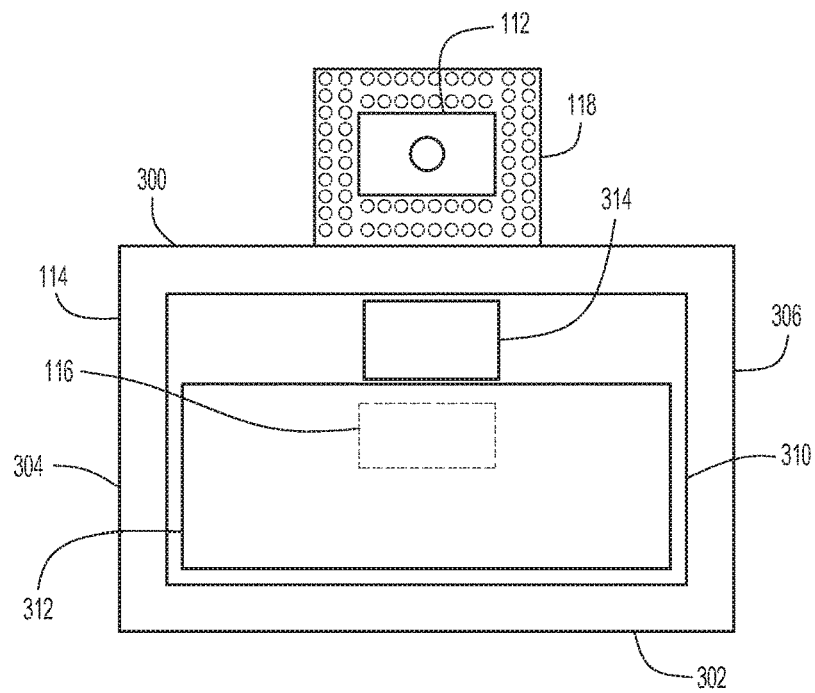
FIG. 3A is a front view of one of the display devices of a video conference endpoint where the integrated camera and microphone array are disposed above the display device, according to an example embodiment.
Figure 3B:
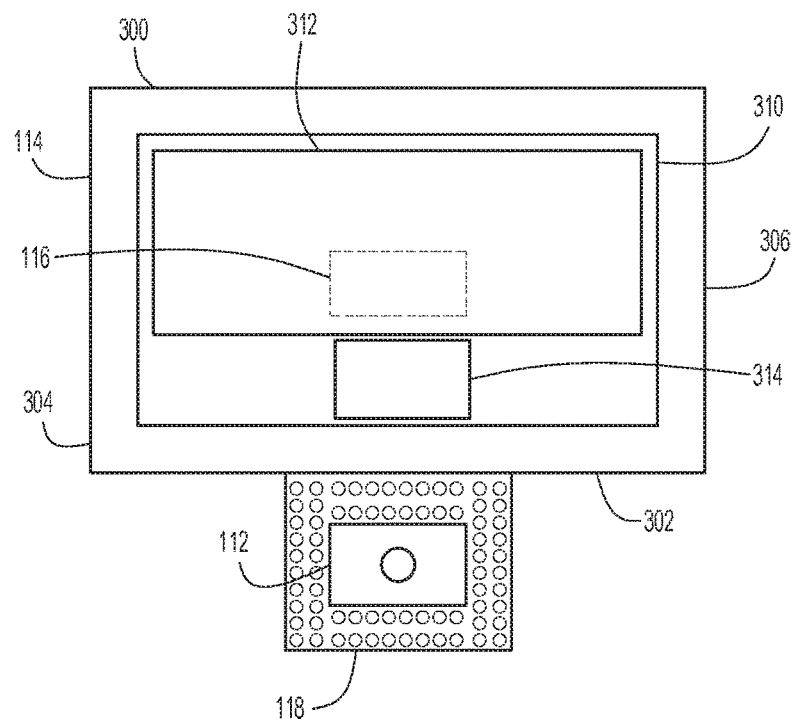
FIG. 3B is a front view of one of the display devices of a video conference endpoint where the integrated camera and microphone array are disposed below the display device, according to an example embodiment.

As illustrated in FIG. 3A, when the camera 112 and integrated microphone array 118 are disposed on or proximate to the top side 300 of the display device 114, the video conference endpoint 104 displays the live video feed 314 on the screen 310 of the display device 114 proximate to the top side 300 and the camera 112. FIG. 3B illustrates that when the camera 112 and integrated microphone array 118 are disposed on or proximate to the bottom side 302 of the display device 114, the video conference endpoint 104 displays the live video feed 314 on the screen 310 of the display device 114 proximate to the bottom side 302 and the camera 112.

Figure 3C:
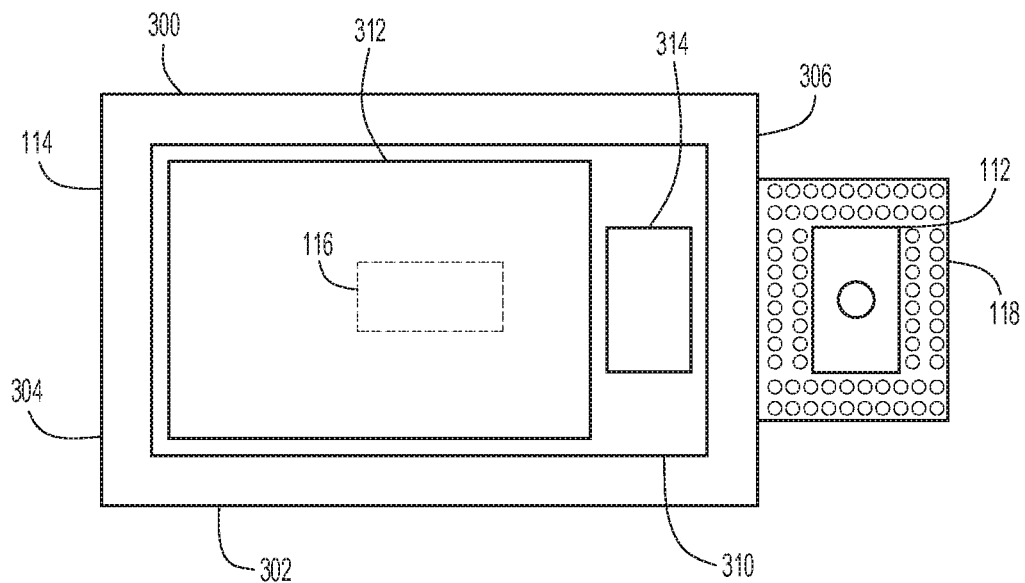
FIG. 3C is a front view of one of the display devices of a video conference endpoint where the integrated camera and microphone array are disposed to the right of the display device, according to an example embodiment.
Figure 3D:
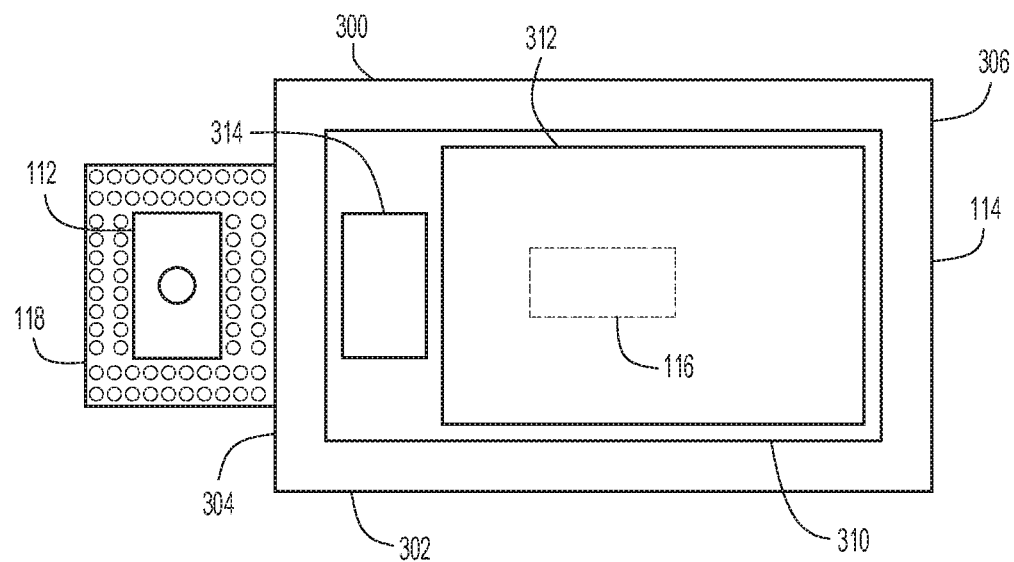
FIG. 3D is a front view of one of the display devices of a video conference endpoint where the integrated camera and microphone array are disposed to the left of the display device, according to an example embodiment.

Furthermore, FIG. 3C illustrates that when the camera 112 and integrated microphone array 118 are disposed on or proximate to the right side 306 of the display device 114, the video conference endpoint 104 displays the live video feed 314 on the screen 310 of the display device 114 proximate to the right side 306 and the camera 112. As illustrated in FIG. 3D, when the camera 112 and integrated microphone array 118 are disposed on or proximate to the left side 304 of the display device 114, the video conference endpoint 104 displays the live video feed 314 on the screen 310 of the display device 114 proximate to the top side 300 and the camera 112. Thus, as illustrated in FIGS. 3A-3D, the live video feed 314 of participants 106 from another endpoint 104 are presented on the screen 310 of the display device 114 such that the live video feed 314 is proximate to the camera 112 attached or coupled to the display device 114. Positioning the live video feed 314 proximate to the camera 112 enables better "eye contact" between participants 106 at different endpoints 104. The positioning of the live video feed 314 on the screen 310 of the display device 114, as described above, gives the appearance that participants 106 at a first endpoint 104 are looking into the camera 112 while actually viewing the live video feed 314 disposed on the screen 310 of the display device 114.

With reference to FIGS. 4A and 4B, depicted is a front view of two display devices 114(1), 114(2) arranged proximate to each other, with the camera 112 and microphone array 118 disposed at various positions with respect to the display devices 114(1), 114(2). Similar to the examples illustrated in FIGS. 3A-3D, the display devices 114(1), 114(2) includes a loudspeaker 116(1), 116(2) integrated with, coupled to, or mounted in close proximity with the display devices 114(1), 114(2). In the examples illustrated in FIGS. 4A and 4B, the loudspeakers 116(1), 116(2) are integrated with the display devices 114(1), 114(2), respectively, such that the loudspeakers 116(1), 116(2) may be disposed within the display devices 114(1), 114(2), respectively. As previously explained, while FIGS. 4A and 4B illustrate the loudspeakers 116(1), 116(2) being disposed centrally on the display devices 112(1), 112(2), it should be appreciated that the loudspeakers 116(1), 116(2) may be disposed in any location within or around the edge/frame of the display devices 112(1), 112(2), including, but not limited to, centrally along the bottom edge of the frame of the display devices 112(1), 112(2), the bottom corners of the display devices 112(1), 112(2), etc. Furthermore, each of the display devices 114(1), 114(2) includes a top side 300(1), 300(2), a bottom side 302(1), 302(2) opposite the top side 300(1), 300(2), a first or left side 304(1), 304(2), and a second or right side 306(1), 306(2) opposite the left side 304(1), 304(2). The display devices 114(1), 114(2) further include a screen 310(1), 310(2), which are configured to display first video content 312(1), 312(4), and which may be capable of displaying second video content 314.

Even with multiple display devices 114(1), 114(2), the video conference endpoint 104 is configured to determine on which screen 310(1), 310(2) to display the second video content or live video feed 314, as well as the positioning on the selected screen 310(1), 310(2) such that the live video feed 314 is positioned proximate to the camera 112 to enable better "eye contact" between participants 106 at different endpoints 104. As illustrated in FIG. 4A, the camera 112 and integrated microphone array 118 are disposed on or proximate to the top side 300(1) of the display device 114(1). Thus, the video conference endpoint 104 configures the screens 310(1), 310(2) of the display devices 114(1), 114(2) to position the live video feed 314 on the screen 310(1) of the display device 114(1) so that the live video feed 314 is proximate to the top side 300(1) and to the camera 112. As illustrated, while the live video feed 314 is configured to share the screen 310(1) of the display device 114(1) with the presentation 312(1), the presentation 312(2) is also configured to encompass the entire screen 310(2) of the display device 114(2). Therefore, participants 106 at the endpoint 104 may be able to view the content of the presentation 312(1), 312(2) on either screen 310(1), 310(2) of either display device 114(1), 114(2), while also viewing the live video feed 314 on the screen 310(1) of the display device 114(1). Because the camera 112 is disposed on the top side 300(1) of the display device 114(1), when participants 106 view the live video feed 314 displayed on the screen 310(1) of the display device 114(1), which is proximate to the top side 300(1) of the display device 114(1), the participants 106 appear to also be looking into the camera 112.

As illustrated in FIG. 4B, the camera 112 and integrated microphone array 118 are disposed between the right side 306(1) of display device 114(1) and the left side 304(2) of display device 114(2). In this illustrated example, the camera 112 and integrated microphone array 118 may be disposed equidistant from the right side 306(1) of display device 114(1) and left side 304(2) of display device 114(2). When the camera 112 and integrated microphone array 118 are disposed equidistant from the right side 306(1) of display device 114(1) and left side 304(2) of display device 114(2), the video conference endpoint 104 may select on which screen 310(1), 310(2) to display the live video feed 314. If the camera 112 and integrated microphone array 118 are disposed between the display devices 114(1), 114(2) such that the camera 112 and integrated microphone array 118 are closer to one of the right side 306(1) of display device 114(1) or the left side 304(2) of display device 114(2), the video conference endpoint 104 may display the live video feed 314 on the screen 310(1), 310(2) to which the camera 112 is closest.

As FIG. 4B illustrates, the camera 112 and integrated microphone array 118 are disposed between the right side 306(1) of display device 114(1) and left side 304(2) of display device 114(2), and the camera 112 and integrated microphone array 118 are also disposed proximate to the bottom sides 302(1), 302(2) of display device 114(1), 114 (2). Thus, as illustrated, the video conference endpoint 104 displays the live video feed 314 in the bottom right corner of the screen 310(1) of the display device 114(1) proximate to both the bottom side 302(1) and the right side 306(1) of the display device 114(1). As previously explained, while the live video feed 314 is configured to share the screen 310(1) of the display device 114(1) with the presentation 312(1), the presentation 312(2) is configured to encompass the entire screen 310(2) of the display device 114(2). Therefore, participants 106 at the endpoint 104 may be able to view the content of the presentation 312(1), 312(2) on either screen 310(1), 310(2) of either display device 114(1), 114 (2), while also viewing the live video feed 314 on the screen 310(1) of the display device 114(1).

Figure 5:
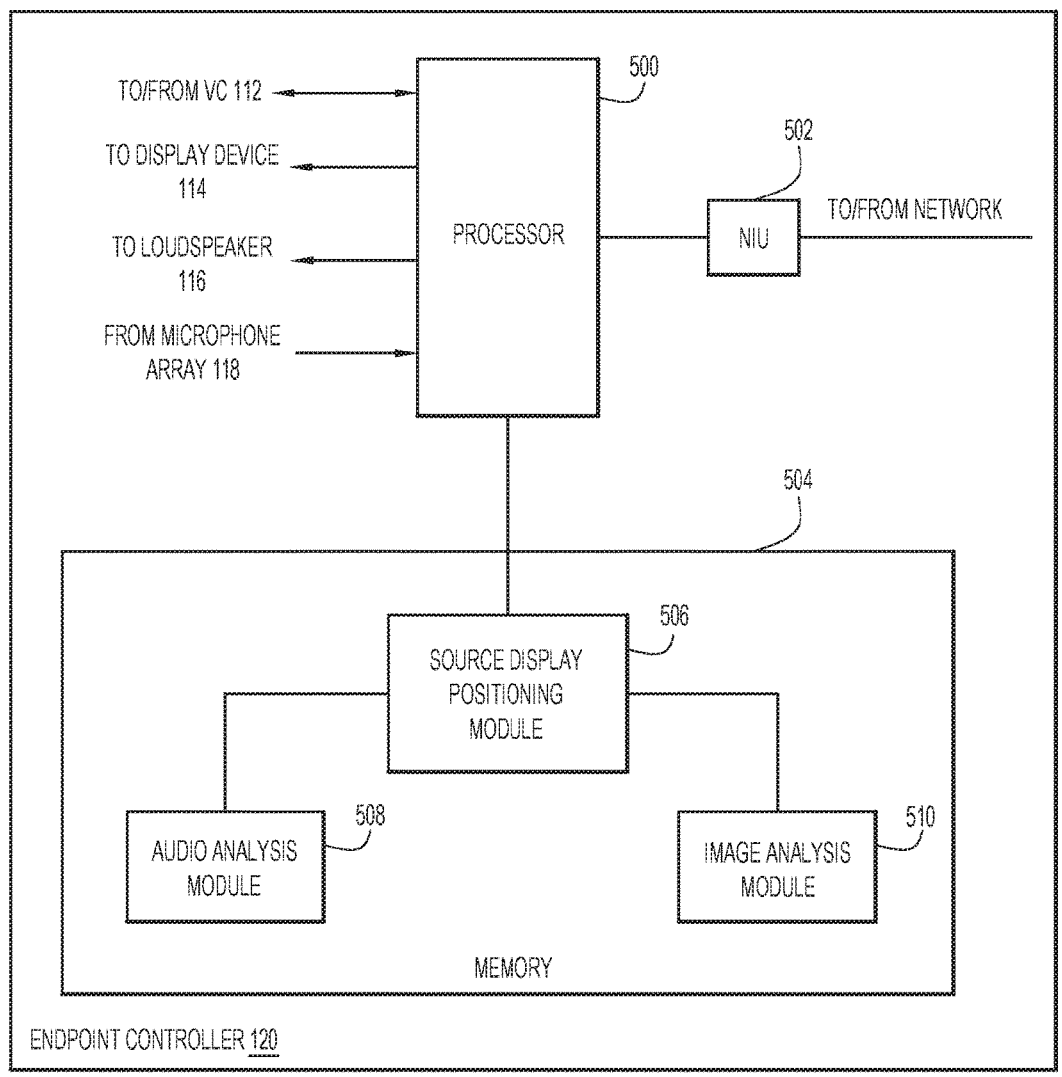
FIG. 5 is a block diagram of an example controller of a video conference endpoint configured to perform techniques described herein, according to an embodiment.

Reference is now made to FIG. 5, which shows an example block diagram of an endpoint controller 120 of video conference endpoint 104 configured to perform techniques described herein. There are numerous possible configurations for endpoint controller 120 and FIG. 5 is meant to be an example. Endpoint controller 120 includes a processor 500, a network interface unit (NIU) 502, and memory 504. The network interface (I/F) unit (NIU) 502 is, for example, an Ethernet card or other interface device that allows the endpoint 104 to communicate over communication network 110 (FIG. 1). Network interface unit 502 may include wired and/or wireless connection capability.

Processor 500 may take the form of a collection of microcontrollers and/or microprocessors, for example, each configured to execute respective software instructions stored in the memory 504. The collection of microcontrollers may include, for example: a video controller to receive, send, and process video signals related to display 114 and video camera 112; an audio processor to receive, send, and process audio signals related to loudspeaker 116 and microphone array 118; and a high-level controller to provide overall control. Portions of memory 504 (and the instruction therein) may be integrated with processor 500. As used herein, the terms "audio" and "sound" are synonymous and interchangeable.

In a distributed processor embodiment, endpoint controller 120 is a distributed processor, including, but not limited to, (i) an audio processor for the microphone array 118 to determine audio angle of arrival of a sound source (as discussed below), and (ii) a video coder/decoder (i.e., codec) that is also configured to analyze the content of the video sources received by the endpoint 104.

The memory 504 may include read only memory (ROM), random access memory (RAM), magnetic disk storage media devices, optical storage media devices, flash memory devices, electrical, optical, or other physical/tangible (e.g., non-transitory) memory storage devices. Thus, in general, the memory 504 may comprise one or more computer readable storage media (e.g., a memory device) encoded with software comprising computer executable instructions and when the software is executed (by the processor 500) it is operable to perform the operations described herein. For example, the memory 504 stores or is encoded with software instructions for Source Display Positioning Module 506 to perform operations described herein for determining the spatial relationship between camera 112 and display devices 114 and determining which display device 114 will display a live video feed. Source Display Positioning Module 506 also includes an Audio Analysis Module 508 and an Image Analysis Module 510. Audio Analysis Module 508 may determine the angle of arrival of a sound source as received by the microphone array 118. Image Analysis Module 510 may evaluate the content of video sources received by the video conference endpoint 104 and determine which display device 114 will display a received video source based on the information acquired by the Audio Analysis Module 508.

Figure 6:
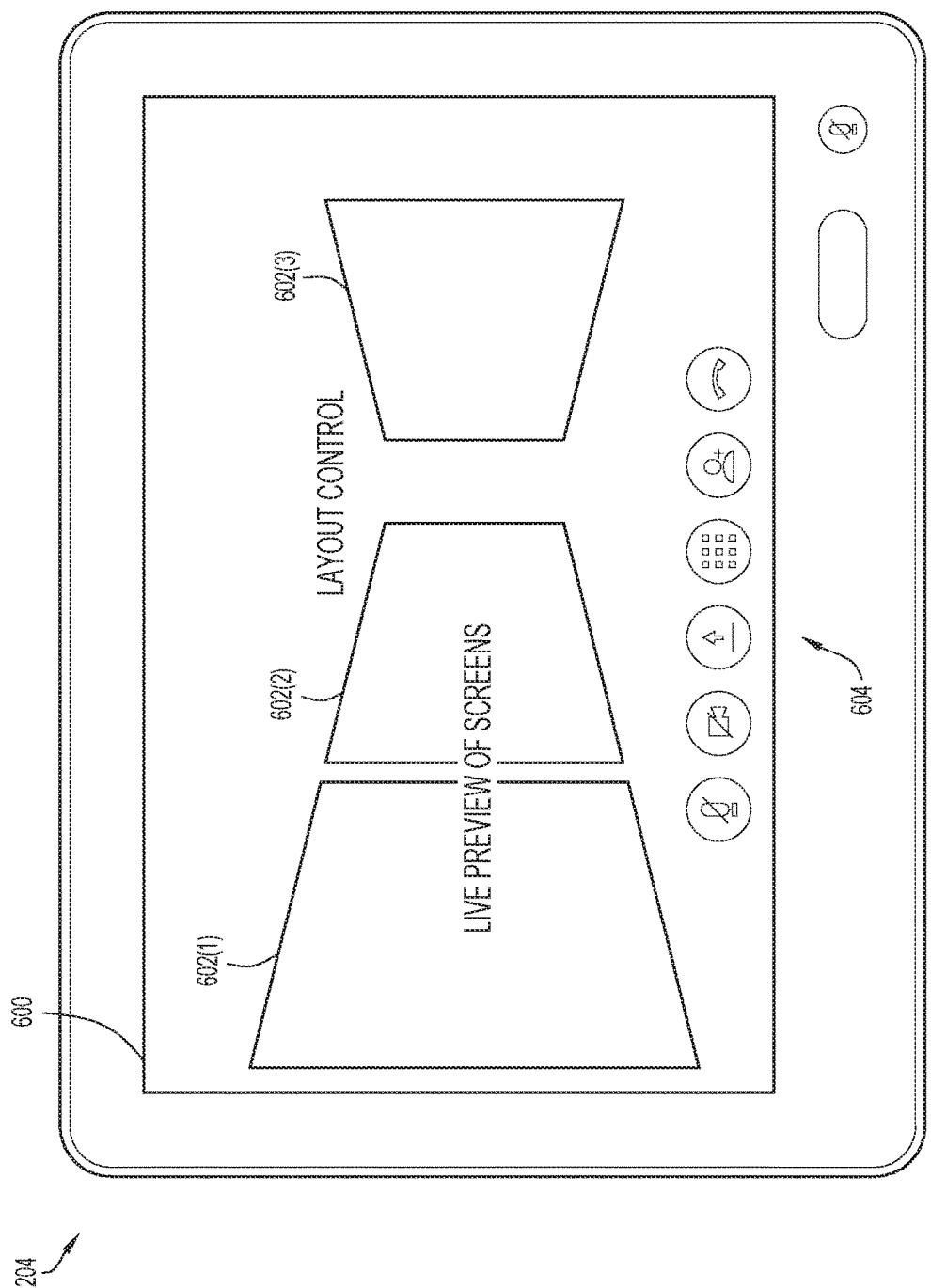
FIG. 6 is an illustration of an example user control device associated with a video conference endpoint, where the user control device displays a rendering of the components of the video conference endpoint.

With reference to FIG. 6, depicted is an example of endpoint user control device 204. The endpoint user control device 204 may have a display 600, such as a touchscreen display. The display 600 of the endpoint user control device 204 may be configured to present rectangular representations 602(1)-602(3) of the display devices 114(1)-114(3) operable at the endpoint 104. Thus, the display 600 of the endpoint user control device 204 may display a three dimensional representation of the conference room 200. As illustrated in the example of FIG. 6, two display representations 602(1), 602(2) are disposed next to each other and are facing the third display representation 602(3). Thus, the conference room 200 may contain two display devices 114(1), 114(2) on one side of the room 200 and a third display device 114(3) on an opposite side of the room 200, where the third display device 114(3) faces the other two display devices 114(1), 114(2). A user may touch or tap the touch screen display 600 of the endpoint user control device 204 at the location of one of the display representations 602(1)-602(3) to control (e.g., display content, volume control, etc.) the display device 114(1)-114(3) represented by the selected display representation 602(1)-602(3). Furthermore, the display 600 of the endpoint user control device 204 may further present other controls and functions 604 at the bottom of the display 600.

Figure 7A:
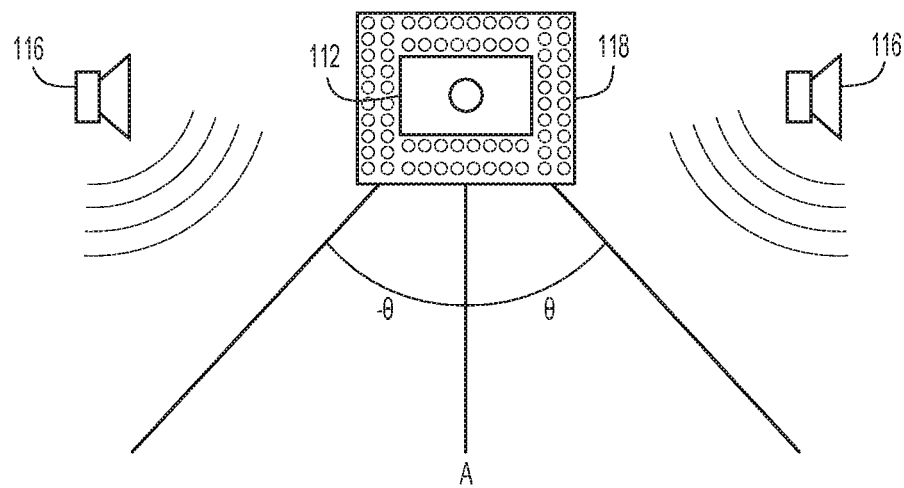
FIG. 7A is a front view of a camera integrated with a microphone array of a video conference endpoint, where the microphone array is detecting audio outputs originating from either the left side or the right side of the microphone array, according to an example embodiment.
Figure 7B:
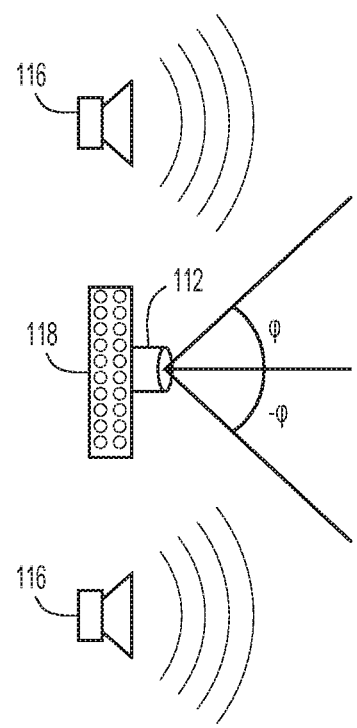
FIG. 7B is a front view of a camera integrated with a microphone array of the video conference endpoint where the microphone array is detecting audio outputs originating from either above or below the microphone array, according to an example embodiment.

With reference to FIGS. 7A and 7B, depicted are audio outputs of a loudspeaker 116 being detected by the microphone array 118 integrated with a camera 112 along a horizontal plane (FIG. 7A) and a vertical plane (FIG. 7B). The microphone array 118 detects audio outputs by the loudspeaker 116 and determines relative angles of the loudspeaker 116 originating the audio output with reference, or in relation to, the direction A in which the camera is facing (e.g., a normal of the camera 112). As illustrated in FIG. 7A, audio outputs detected by the microphone array 118 and originating from a loudspeaker 116 disposed to the right of the camera 112 may be given an angular measurement of $\theta$, while audio outputs detected by the microphone array 118 and originating from a loudspeaker 116 disposed to the left of the camera 112 may be given an angular measurement of $-\theta$. Thus, the angular measurements of $\theta$ and $-\theta$ represent the azimuth angles of the detected audio output with respect to the normal A of the camera 112. As illustrated in FIG. 7B, audio outputs detected by the microphone array 118 and originating from a loudspeaker 116 disposed above the camera 112 may be given an angular measurement of $\varphi$, while audio outputs detected by the microphone array 118 and originating from a loudspeaker 116 disposed below the camera 112 may be given an angular measurement of $-\varphi$. Thus, the angular measurements of $\varphi$ and $-\varphi$ represent the elevation angles of the detected audio output with respect to the normal A of the camera 112.

Figure 8:
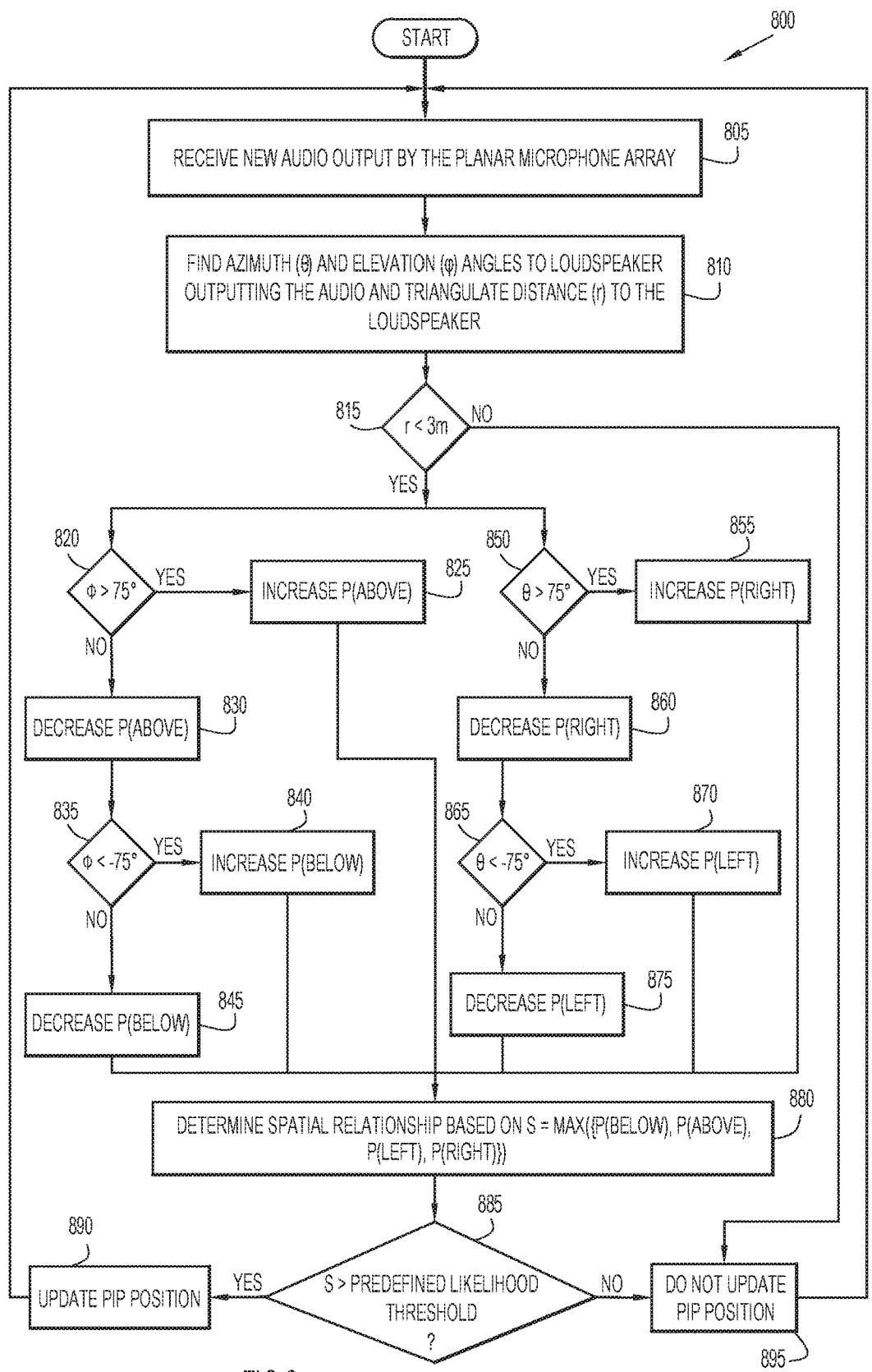
FIG. 8 is a flowchart of a method of updating the display device that receives a live video feed based on the determined probability an audio output originates from above, below, to the right of, and to the left of the microphone array, according to an example embodiment.

With reference to FIG. 8 and continued reference to FIGS. 3A-3D, 4A, 4B, 5, 7A, and 7B, there is depicted a flowchart of an example method 800 of determining the spatial relationship between a display device 114 with an integrated loudspeaker 116 and a camera 112 with an integrated microphone array 118 based on the audio generated by the loudspeaker 116. Initially, at 805, the microphone array 118 receives a new frame of audio samples from a loudspeaker 116. The endpoint controller 120 may be configured to cause the loudspeaker 116 to generate an audio output and the microphone array 118 is configured to detect the audio output. At 810, the endpoint controller 120 begins determining the azimuth (θ) and elevation (φ) angles to the loudspeaker 116 from the microphone array 118, while also triangulating a distance (r) from the loudspeaker 116 generating the audio outputs detected by the microphone array 118.

At 815, the endpoint controller 120 determines whether the audio output detected by the microphone array 118 originates from a location (e.g., a loudspeaker 116) that is less than a predetermined distance (e.g., three meters) away from the microphone array 118. If it is determined at 815 that the loudspeaker 116 is less than the predetermined distance (three meters) away from the microphone array 118, then the endpoint controller 120 continues to determine the azimuth and elevation angles of the detected audio output with respect to the microphone array 118 at 820 and 850. However, if, at 815, the endpoint controller 120 determines that the detected audio output is not less than the predetermined distance (three meters) away from the microphone array 118, then the endpoint controller 120 skips determining the azimuth and elevation angles of the detected audio, and, at 895, does not update the picture in picture positioning of the live video feed 314. When the detected audio output originates more than the predetermined distance (three meters) from the microphone array 118, the positioning of the live video feed 314 may not be updated because the live video feed 314 may already be disposed in an optimized position. However, other examples of detected audio outputs that originated from more than three meters from the microphone array 118 could include audio outputs that originate from external sources (e.g., talking participants 106, participant 106 devices, etc.), detected the audio outputs that originated from a loudspeaker 116 but reflected off of the floor and/or walls, etc.

After determining that the detected audio output originates from a location less than the predetermined distance (three meters) away from the microphone array 118 (e.g., from a loudspeaker 116 disposed less than three meters from the microphone array 118), then at 820, the endpoint controller 120 calculates whether the audio output detected by the microphone array has an elevation angle φ greater than 75 degrees. If, at 820, the determined elevation angle φ is greater than 75 degrees, then, at 825, the endpoint controller 120 increases a probability value that the loudspeaker 116 is above the camera 112 (P(above)). If, at 820, the determined elevation angle φ is not greater than 75 degrees, then, at 830, the endpoint controller 120 decreases the probability that the loudspeaker 116 is above the camera 112 (P(above)).

If the endpoint controller 120 decreases the probability that the loudspeaker 116 is above the camera (P(above)), then, at 835, the endpoint controller 120 calculates whether the audio output detected by the microphone array has an elevation angle φ less than −75 degrees. If, at 835, the determined elevation angle φ is less than −75 degrees, then, at 840, the endpoint controller 120 increases the probability that the loudspeaker 116 is below the camera 112 (P(below)). If, at 835, the determined elevation angle φ is not less than −75 degrees, then, at 845, the endpoint controller 120 decreases the probability that the loudspeaker 116 is below the camera 112 (P(below)).

At 850, the endpoint controller 120 calculates whether the audio output detected by the microphone array has an azimuth angle θ greater than 75 degrees. If, at 850, the determined azimuth angle θ is greater than 75 degrees, then, at 855, the endpoint controller 120 increases the probability that the loudspeaker 116 is disposed to the right of the camera 112 (P(right)). If, at 850, the determined azimuth angle θ is not greater than 75 degrees, then, at 860, the endpoint controller 120 decreases the probability that the loudspeaker 116 is disposed to the right of the camera 112 (P(right)).

If the endpoint controller 120 decreases the probability that the loudspeaker 116 is disposed to the right of the camera 112 (P(right)), then, at 865, the endpoint controller 120 calculates whether the audio output detected by the microphone array 118 has an azimuth angle θ less than −75 degrees. If, at 865, the determined azimuth angle θ is less than −75 degrees, then, at 870, the endpoint controller 120 increases the probability that the loudspeaker 116 is disposed to the left of the camera 112 (P(left)). If, at 865, the determined azimuth angle θ is not less than −75 degrees, then, at 875, the endpoint controller 120 decreases the probability that the loudspeaker 116 is disposed to the left of the camera 112 (P(left)).

After all of the probabilities P(above), P(below), P(right), P(left) have been calculated and it is verified that the loudspeaker 116 is less than 3 meters away from the microphone array 118, the endpoint controller 120, at 880, determines a spatial relationship value S between the loudspeaker 116 generating the audio output and the microphone array 118 by determining which calculated probability P(above), P(below), P(right), P(left) has the largest value. In one embodiment, the endpoint controller 120 may also disregard any of the probabilities P(above), P(below), P(right), P(left) with lower values. At 885, the endpoint controller 120 then determines whether or not the spatial relationship value S is greater than a predetermined threshold value. If, at 885, the endpoint controller 120 determines that the spatial relationship value S is greater than the predefined threshold, then, at 890, the endpoint controller 120 updates the picture in picture positioning of the live video feed 314 so that the live video feed 314 is positioned proximate to the camera 112 as illustrated in FIGS. 3A-3D, 4A, and 4B. However, if, at 885, the endpoint controller 120 determines that the spatial relationship value S is less than the predefined threshold, then, at 895, the endpoint controller 120 does not update the picture in picture positioning of the live video feed 314 because the live video feed 314 may already be disposed in an optimized position proximate to the camera 112, as illustrated in FIGS. 3A-3D, 4A, and 4B.

In another example, with reference to the conference rooms 200, 200(1), and 200(2) depicted in FIGS. 2A and 2B, and with continued reference to FIGS. 7A and 7B, the endpoint controller 120 is configured to determine which of cameras 112(1)-112(3) is best oriented to capture a participant 106 presenting or collaborating on the user-interactive display device 114(4). In this example, the endpoint controller 120 may utilize the microphone arrays 118(1)-118(3) integrated with the cameras 112(1)-112(3) to detect audio outputs from the loudspeaker 116(4) of user-interactive display device 114(4), which is configured as a whiteboard or other similar presentation/display device, in order to determine the spatial relationship between the cameras 112(1)-112(3) and the user-interactive display device 114(4). The endpoint controller 120 may, from the detected audio output, calculate the azimuth and elevation angles, as well as the distance, of the loudspeaker 116(4) with respect to the each of the microphone arrays 118(1)-118(3). As previously explained, because the loudspeaker 116(4) is integrated with the user-interactive display device 114(4) and because the microphone arrays 118(1)-118(3) are integrated with the respective cameras 112(1)-112(3), the calculated distance and azimuth and elevation angles also represent the spatial relationship of the user-interactive display device 114(4) with respect to the respective cameras 112(1)-112(3). However, unlike the example method of FIG. 8, where the endpoint controller 120 makes its determination on which display device 114(1)-114(4) is best utilized to display a video source based on a calculated short distance (e.g., less than 3 meters from one of the cameras 112(1)-112(4)) and calculated large azimuth and elevation angles (e.g., greater than 75 degrees with respect to the normal A of one of the cameras 112(1)-112(4)), the endpoint controller 120 may assign the function of displaying the presenting participant 106 standing at or next to the user-interactive display device 114(4) to a particular one of the cameras 112(1)-112(3) that is calculated to be a large distance from the user-interactive display device 114(4) and that has relatively small azimuth and elevation angles with respect to the user-interactive display device 114(4). When it is calculated that user-interactive display device 114(4) is greater than a predetermined distance from one of the cameras 112(1)-112(3), and that the user-interactive display device 114(4) is oriented with relatively small azimuth and elevation angles (i.e., less than or equal to a predetermined angle) with respect to the normal A of one of the cameras 112(1)-112(3), the endpoint controller 120 may make the determination that a particular one of the cameras 112(1)-112(3) is both pointed in the general direction of the user-interactive display device 114(4) (e.g., the normal A of one of the cameras 112(1)-112(3) extends in the general direction of the user-interactive display device 114(4)) and is disposed within the conference room 200 at a location opposite of the user-interactive display device 114(4). As illustrated in FIG. 2A, the endpoint controller 120 of conference room 200 may make the determination that camera 112(2) has an acceptable field of view of the user-interactive display device 114(4), where camera 112(2) is capable of capturing the user-interactive display device 114(4), items displayed on the user-interactive display device 114(4), and any participant that may be presenting or collaborating on the user-interactive display device 114(4). After making this determination, the endpoint controller 120 may assign camera 112(2) with the function of capturing the user-interactive display device 114(4) and any participant that may be present at the user-interactive display device 114(4) such that the field of view of the camera 112(2) can be transmitted to another video conference endpoint.

With continued reference to FIGS. 2A, 2B, and 8, once the spatial relationship (e.g., the azimuth (θ) angles, the elevation (φ) angles, and the distance (r)) between each of the display devices 114(1)-114(4) and each of the cameras 112(1)-112(4) has been calculated, the endpoint controller 120(1) of the first conference room 200(1) can assign inbound video sources (e.g., video sources received by the first conference room 200(1) from the second conference room 200(2)) to the display devices 114(1)-114(4) within the first conference room 200(1). The assignment of the inbound video sources to the display devices 114(1)-114(4) may be based on the spatial relationship of each of the display devices 114(1)-114(4) with each of the cameras 112(1)-112(4), and the respective locations of each of the display devices 114(1)-114(4) and each of the cameras 112(1)-112(4) within the first conference room 200(1). Similarly, the endpoint controller 120(1) may also assign video outputs from the cameras 112(1)-112(4) to an outgoing video feed sent from the first conference room 200(1) to the second conference room 200(2). As previously explained, the cameras 112(1)-112(4) may be configured and operated to capture video of different views or scenes of multiple participants 106 seated around a table 202(1) opposite from or facing (i.e., in front of) the cameras 112(1)-112(4) (and display devices 114(1)-114(4)). The cameras 112(1)-112(4) may also be configured and operated to capture video of participants 106 disposed around particular display devices 114(1)-114(4). The assignment of the captured video may be based on the data representing the spatial relationship of each of the cameras 112(1)-112(4) with each of the display devices 114(1)-114(4), and the respective location of each of the cameras 112(1)-112(4) within the first conference room 200(1). Each of the video outputs may be tagged or labeled with metadata indicating the respective field of view of each of the cameras 112(1)-112(4) that captured each of the video outputs. This tagged metadata may be utilized by a remote conference room, such as the second conference room 200(2), to further determine how to assign the inbound video sources of the second conference room 200(2) to the display devices 114(5)-114(8) of the second conference room 200 (2). The tagged metadata is also useful for the remote conference rooms, such as the second conference room 200(2), when the inbound video source simultaneously includes video outputs from more than one camera 112(1)-112(4) of the first conference room 200(1), this is referred to as multi-stream. That is, a video feed may include multiple video streams.

Figure 9:
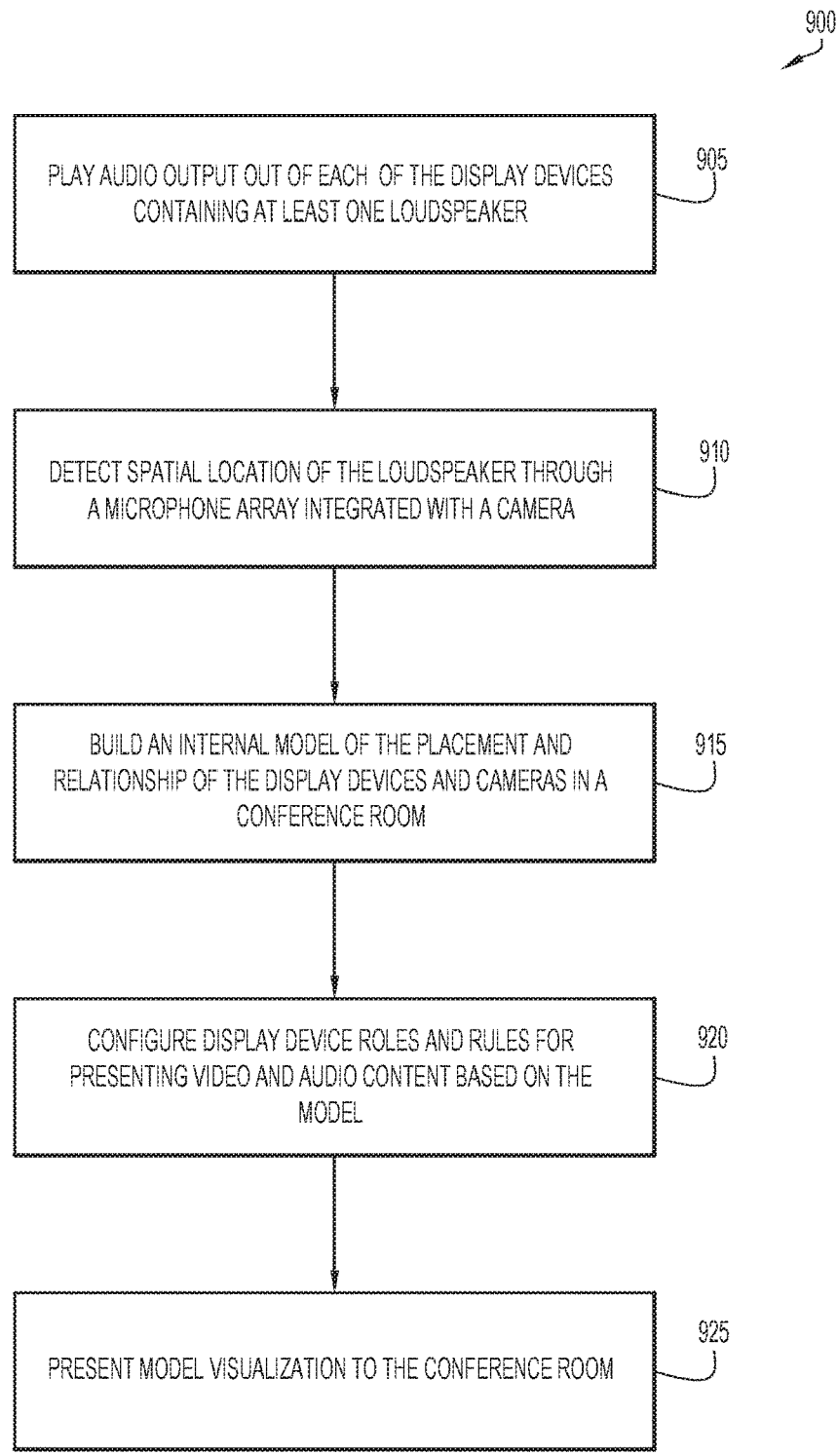
FIG. 9 is a flowchart of a method for configuring the roles of a plurality of display devices of a conference room based on detected audio outputs of the plurality of display devices, according to an example embodiment.

With reference to FIG. 9, depicted is a flowchart of an example method 900 for utilizing the loudspeakers 116 and the microphone array 118 to determine spatial relationship between the camera 112 and the display devices 114 disposed within a conference room 200. Reference is also made to FIGS. 3A-3D for purposes of the description of FIG. 9. At 905, the endpoint controller 120 plays an audio output out of each of the display devices 114 that contain a loudspeaker 116. The display devices 112 may be connected to the endpoint 104 via a high-definition multimedia interface (HDMI) cable, which is capable of transporting both video and audio signals over the same cable. In the event that an audio signal is a multi-channel audio signal, the loudspeaker 116 integrated with the display device 114 may output a separate audio output for each channel of the audio signal. At 910, the microphone array 118 integrated with the camera 112 detects the audio outputs to determine the spatial location (e.g., above, below, side, opposite, etc.) of the display device 114 with respect to the camera. The steps at 905 and 910 may be repeated for each of the display devices 114 and for each of the cameras 112 located within the conference room 200. The detection and determination of the spatial relationship between the cameras 112 and the display devices 114 may be completed as described above with respect to FIG. 8.

Once all of the spatial relationship and placement data has been collected, the endpoint controller, at 915, builds an internal model of the placement and relationship of the display devices 114 and cameras 112 in the conference room 200. At 920, the endpoint controller 120 then configures the display device roles and rules for presenting video and audio content based on the derived model and the content of the video and audio sources. For example, if, based on the derived model, the camera 112 is adjacent to (e.g., above, below, to the side) a display device 114 and the content of one of the video and audio sources is a live video feed 314 of another endpoint 104, then the endpoint controller 120 may determine that that display device 114 should receive and display the live video feed 314. In another example, if, based on the derived model, the camera 112 is disposed opposite of the display device 114 (e.g., the camera 112 is across the conference room 200 from a user-interactive display device 114), the endpoint controller 120 may determine that that camera 112 should be utilized to display the presentation presented on that display device 114. Finally, at 925, the endpoint controller 120 presents the three dimensional model to the conference room 200 through the display 600 of the endpoint user control device 204, illustrated in FIG. 6.

Figure 10:
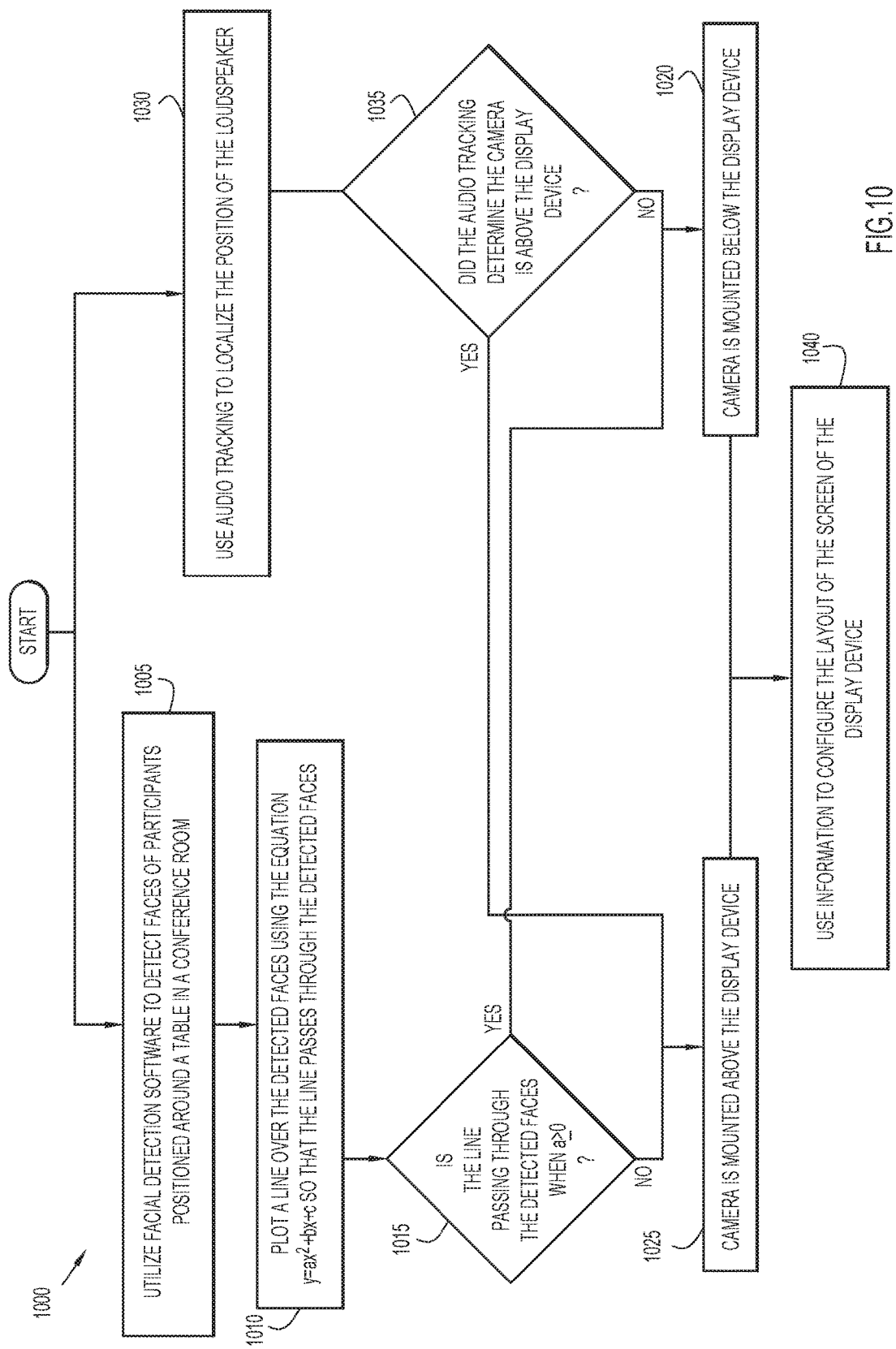
FIG. 10 is a flowchart of a method for configuring the roles of a plurality of display devices of a conference room based on detected audio outputs of the plurality display devices, the detected shape of the table of the conference endpoint, and/or the orientation of the detected faces within the conference room, according to an example embodiment.

With reference to FIG. 10, illustrated is a flowchart of a method 1000 for determining the spatial relationship between a single camera 112 and a single display device 114, where the camera 112 is disposed either above or below the display device 114. Reference is also made to FIGS. 2A, 2B, 3A-3D, 4A, 4B, 5, 8, and 11A-11C for purposes of the description of FIG. 10. The method 1000 includes a plurality of processes for determining the location of the camera 112 with respect to the display device 114. These processes include using the microphone array 118 integrated with the camera 112 to determine the location of the loudspeaker 116 integrated with the display device 114, as described above, and detecting the faces of participants 106 seated around the table 202 within the conference room 200. These techniques may be performed together or in lieu of each other when the conditions for one of the techniques are not sufficient for that technique to adequately determine the positioning of the camera 112 with respect to the display device 114

At 1005, the endpoint controller 120 utilizes facial detection software, in conjunction with the camera 112 of a conference room 200 of an endpoint 104, to detect the faces of participants 106 positioned around a table 202 within a conference room 200. Facial detection techniques are well known in the art and are not described in detail herein. At 1010, the endpoint controller 120 analyzes the image captured by the camera 112 and plots a line passing through the detected faces around the table 202, as shown in FIGS. 11A-11C and described hereinafter. The line passing through the detected faces could be a parabola, which may be a function of the equation $y=ax^2+bx+c$, that is fitted over the location of the detected faces using any conventional method including, but not limited to, the method of least squares. When the line passing through the detected faces is represented by the equation $y=ax^2+bx+c$ and the value of "a" is greater than zero, than the line may have a curvature that opens upward, like that of line B illustrated in FIG. 11A. If "a" has a value of zero in the equation $y=ax^2+bx+c$, then the line represented by the equation $y=ax^2+bx+c$ may be a straight line, like that of line C illustrated in FIG. 11B. However, when "a" in the equation $y=ax^2+bx+c$ is of a value less than zero, then the line represented by the equation $y=ax^2+bx+c$ may have a downward facing curvature, like that of line D illustrated in FIG. 11C.

After the endpoint controller 120 plots a line passing through the detected faces of the participants 106 within a conference room 200, the endpoint controller 120, at 1015, determines whether or not the value of "a" in the equation $y=ax^2+bx+c$ is greater than or equal to zero. If, at 1015, the value of "a" is found to be greater than or equal to zero, then, at 1020, the endpoint controller 120 can make the determination that the camera 112 is disposed at a lower height within the conference room 200 and is thus likely disposed below the display device 114 in the conference room 200. FIGS. 11A and 11B illustrate the field of view of the camera 112 when the camera 112 is mounted below the display device 114. FIG. 11A illustrates the field of view of the camera 112 and the curved line B, where the value of "a" is greater than zero. The detected faces of the participants 106 seated around the conference table 202 in FIG. 11A are aligned with the upwardly curved line B. FIG. 11B illustrates the field of view of the camera 112 and horizontal line C, where the value of "a" is equal to zero. The detected faces of the participants 106 seated around the conference table 202 in FIG. 11B are aligned with horizontal line C. The difference between line B and line C may demonstrate that the camera 112 in FIG. 11A is disposed at a lower height than the camera 112 in FIG. 11B. As the height of the camera 112 increases, the curvature of the line through the detected faces of the participants transitions from an upwardly curved line to a downwardly curved line. Thus, FIG. 11B illustrates a field of view of the camera 112 when the camera 112 is disposed more closely to being equal in height, or is disposed equal in height, with the display device 114 than that of FIG. 11A.

However, if, at 1015, the value of "a" is found to be less than zero, then, at 1025, the endpoint controller 120 can make the determination that the camera 112 is disposed at a higher height within the conference room 200 and is thus likely disposed above the display device 114 in the conference room 200. FIG. 11C illustrates the field of view of the camera 112 when the camera 112 is mounted above the display device 114. FIG. 11A illustrates the field of view of the camera 112 and the curved line D, where the value of "a" is less than zero. The detected faces of the participants 106 seated around the conference table 202 in FIG. 11A are aligned with the downwardly curved line D.

In some embodiments, in order to rely on the facial detection method the detected faces of the participants 106 disposed in the middle of the field of view of the camera 112 need to be smaller than the detected faces of the participants 106 faces disposed on the sides of the field of view of the camera 112. As illustrated in FIGS. 11A-11C, the detected faces disposed on the sides of the field of view of the camera 112 are larger than those of the detected faces disposed centrally in the field of view of the camera 112. In addition, the least square error during curve fitting needs to be below a certain predetermined threshold. If the least square error exceeds the predetermined threshold, the seating arrangement around the conference room table 202 may not be conducive to the facial detection method (e.g., a large conference room table 202 may not be disposed in the middle of the conference room 200). In other embodiments, the reference value by which to compare the value of "a" from the equation of $y=ax^2+bx+c$ may be greater or lesser than zero.

Returning back to FIG. 10, in addition to utilizing facial detection software at 1005, or instead of using facial detection software (e.g., when participants 106 are not located within the conference room 200, not enough participants 106 are located within the conference room 200, etc.), then, at 1030, the endpoint controller 120 may, as described above with respect to FIGS. 7A, 7B, 8, and 9, track audio outputs, using the microphone array 118 integrated with the camera 112, to localize the position of the loudspeaker 116 integrated with the display device 114. At 1035, the endpoint controller 120 determines, based on the audio tracking, if the camera 112 is mounted above or below the display device 114.

At 1035, once the information has been collected regarding whether the camera 112 is mounted above or below the display device 114, the endpoint controller 120 uses the information to update the layout of the screen 310 of the display device 114. As previously explained and illustrated with regard to FIG. 3A, if it is determined that the camera 112 is mounted above the display device 114, then the endpoint controller 120 may position the live video feed 314 on the screen 310 proximate to the top edge 300 of display device 114. Conversely, as previously explained and illustrated with regard to FIG. 3B, if it is determined that the camera 112 is mounted below the display device 114, then the endpoint controller 120 may position the live video feed 314 on the screen 310 proximate to the bottom edge 302 of display device 114.

Figure 12:
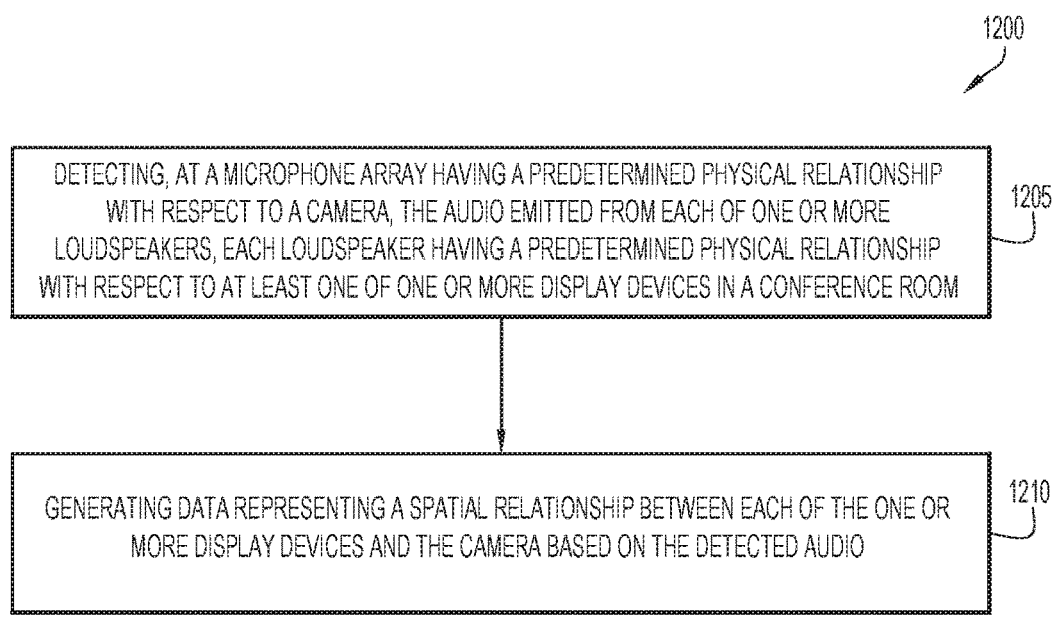
FIG. 12 is a flowchart of a method of generating data representing the spatial relationship of the components of the video conference endpoint, according to an example embodiment.

With reference to FIG. 12, illustrated is a flowchart of a method 1200 performed by the endpoint controller 120 for assigning video and audio sources to the display devices 114 located within a conference room. Reference is also made to FIGS. 2A, 2B, 3A-3D, 4A-4B, and 5 for purposes of the description of FIG. 12. At 1205, the endpoint controller 120 detects, at a microphone array 118 having a predetermined physical relationship with respect to a camera 112, the audio emitted from each of one or more loudspeakers 116, where each of the one or more loudspeakers 116 have a predetermined physical relationship with respect to at least one of one or more display devices 114 in a conference room. Thus, the endpoint controller 120 enables the microphone array 118 to detect the audio that is played, generated, or emitted from each loudspeaker 116 of each display device 114 located within a conference room 200. At 1210, the endpoint controller 120 utilizes known triangulation and audio localization algorithms to determine the direction and distance from the microphone array 118 to each of the loudspeakers 116 that output audio received by the microphone array 118. In other words, from the detected audio, the endpoint controller 120 may determine the spatial relationship between the microphone array 118 and the loudspeakers 116 within a conference room 200. Because, as previously explained, the microphone array 118 has a known predetermined physical relationship with respect to the camera 112 and each of the loudspeakers 116 has a known predetermined physical relationship with respect to the one of the display devices 114, determining the spatial relationship between the microphone array 118 and the loudspeakers 116 also determines the spatial relationship between the camera 112 and the display devices 114.

After determining the spatial relationship between the camera 112 and the display devices 114, the endpoint controller 120 may then assign video sources to each of the plurality of display devices based on the data representing the spatial relationship, the content of the video sources, and the use of the camera 112. For example, if it is determined that a camera is disposed adjacent to a display device 114 (e.g., mounted directly above or directly below the display device 114), then that display device 114 may receive a live video feed of another remote video conference endpoint operated by other participants 106 while the camera 112 records a live video feed of the conference room 200 in which it is disposed. The live video feed of the conference room 200 may be sent to the remote video conference endpoint for viewing by participants at that remote video conference endpoint. In another example, as previously explained, if it is determined that another display device, such as a user-interactive display device, is disposed opposite of a camera 112, that camera 112 may be used to show the participant 106 presenting or collaborating on the user-interactive display device 114.

Techniques presented herein automatically determine the roles of the cameras and the display devices of a video conference endpoint within a conference room when participating in a video conference. The detection of the placement of components of a video conference endpoint/system in a room is automated using spatial detection of audio signals emitted by the components using a microphone array and image analysis to optimize screen usage and visualization of the room for simpler control. No additional equipment is needed. Rather, the equipment to be installed as part of the video conference endpoint is used for the process. This makes it easy to add and remove components, such as a digital whiteboard to/from that room. In addition to automatic setup, these techniques can be useful in suggesting layouts and room configurations in a semi-manual wizard-guided type of setup procedure.

Specifically, generated audio from the each of the loudspeakers of the one or more display devices is detected by the microphone arrays of each of the cameras to determine the spatial relationship between each of the cameras and each of the loudspeakers within a conference room. The determined spatial relationship, along with the content of the video and audio sources of the video conference may be used by the controller of the video conference endpoint to automatically determine the roles of the one or more display devices and each of the cameras of the conference room. This eliminates a need to manually set up each video conference room, and eliminates the need to have participants of the video conference manually switch the roles of the display devices and the cameras during a video conference.

In summary, in one form, a method is provided comprising: detecting, at a microphone array having a predetermined physical relationship with respect to a camera, the audio emitted from each of one or more loudspeakers, each loudspeaker having a predetermined physical relationship with respect to at least one of one or more display devices in a conference room; and generating data representing a spatial relationship between each of the one or more display devices and the camera based on the detected audio.

In another form, an apparatus is provided comprising: a camera configured to capture video of a field of view; a microphone array having a predetermined physical relationship with respect to the camera, the microphone array configured to transduce audio received at the microphone array; and a processor to control the camera and the microphone array to: cause the microphone array to detect audio emitted from one or more loudspeakers having a predetermined physical relationship with respect to at least one of one or more display devices in a conference room; and generate data representing a spatial relationship between each of the one or more display devices and the camera based on the detected audio.

In yet another form, a (non-transitory) processor readable medium is provided. The medium stores instructions that, when executed by a processor, cause the processor to: detect, at a microphone array having a predetermined physical relationship with respect to a camera, the audio emitted from each of one or more loudspeakers, each loudspeaker having a predetermined physical relationship with respect to at least one of one or more display devices in a conference room; and generate data representing a spatial relationship between each of the one or more display devices and the camera based on the detected audio.

As described herein, the data representing the spatial relationship may be used to assign one or more video sources of an incoming video feed from a remote conference room to corresponding ones of the one or more display devices. Similarly, the data representing the spatial relationship may be used to assign video outputs from a plurality of cameras in a conference room to an outgoing video feed to be sent to a remote conference room.

The above description is intended by way of example only. Various modifications and structural changes may be made therein without departing from the scope of the concepts described herein and within the scope and range of equivalents of the claims.

What is claimed is:

1. A method comprising:
   detecting, at a microphone array having a predetermined physical relationship with respect to a camera, audio emitted from each of one or more loudspeakers, each loudspeaker having a predetermined physical relationship with respect to at least one of a plurality of display devices in a conference room;
   generating data representing a spatial relationship between each of the plurality of display devices and the camera based on the detected audio, wherein generating data representing the spatial relationship includes determining azimuth and elevation angles between the camera and each of the plurality of display devices; and
   assigning one or more video sources of an incoming video feed from a remote conference room to corresponding ones of the plurality of display devices based on the data representing the spatial relationship and content of the one or more video sources.

2. The method of claim 1, wherein generating data representing the spatial relationship further comprises:
   determining, based on the determined azimuth and elevation angles, at least one of: a first probability that the camera is disposed above one of the display devices, a second probability that the camera is disposed below one of the display devices, a third probability that the camera is disposed right of one of the display devices, and fourth probability that the camera is disposed left of one of the display devices.

3. The method of claim 2, wherein generating data representing the spatial relationship further comprises:
   determining a spatial relationship value by determining which of the first probability, the second probability, the third probability, and the fourth probability contains a largest probability value.

4. The method of claim 3, wherein assigning comprises:
   assigning a video source of the incoming video feed to be displayed on a top side of a screen, a bottom side of the screen, a right side of the screen, or a left side of the screen of one of the display devices based on the spatial relationship value.

5. The method of claim 1, further comprising:
   determining, from the detected audio of each of the one or more loudspeakers, whether each of the one or more loudspeakers is within a predetermined distance from the microphone array.

6. The method of claim 1, wherein the microphone array is integrated with the camera, and each of the one or more loudspeakers is integrated with one of the plurality of display devices.

7. An apparatus comprising:
   a camera configured to capture video of a field of view;
   a microphone array having a predetermined physical relationship with respect to the camera, the microphone array configured to transduce audio received at the microphone array; and
   a processor configured to control the camera and the microphone array, wherein the processor is configured to:
      cause the microphone array to detect audio emitted from each of one or more loudspeakers, each loudspeaker having a predetermined physical relationship with respect to at least one of a plurality of display devices in a conference room;
      generate data representing a spatial relationship between each of the plurality of display devices and the camera based on the detected audio by determining azimuth and elevation angles between the camera and each of the plurality of display devices; and
      assign one or more video sources of an incoming video feed from a remote conference room to corresponding ones of the plurality of display devices based on the data representing the spatial relationship and content of the one or more video sources.

8. The apparatus of claim 7, wherein the processor, when generating data representing the spatial relationship, is further configured to:
   determine, based on the determined azimuth and elevation angles, at least one of: a first probability that the camera is disposed above one of the display devices, a second probability that the camera is disposed below one of the display devices, a third probability that the camera is disposed right of one of the display devices, and a fourth probability that the camera is disposed left of one of the display devices.

9. The apparatus of claim 8, wherein the processor, when generating data representing the spatial relationship, is further configured to:
   determine a spatial relationship value by determining which of the first probability, the second probability, the third probability, and the fourth probability contains a largest probability value.

10. The apparatus of claim 9, wherein the processor is further configured to:
    assign a video source of the incoming video feed to be displayed on a top side of a screen, a bottom side of the screen, a right side of the screen, or a left side of the screen of one of the display devices based on the spatial relationship value.

11. The apparatus of claim 7, wherein the processor is further configured to:
    determine, from the detected audio of each of the one or more loudspeakers, whether each of the one or more loudspeakers is within a predetermined distance from the microphone array.

12. The apparatus of claim 7, wherein the microphone array is integrated with the camera, and each of the one or more loudspeakers is integrated with one of the plurality of display devices.

13. One or more non-transitory computer readable storage media, the computer readable storage media being encoded with software comprising computer executable instructions, and when the software is executed, operable to:
    detect, at a microphone array having a predetermined physical relationship with respect to a camera, audio emitted from each of one or more loudspeakers, each loudspeaker having a predetermined physical relationship with respect to at least one of a plurality of display devices in a conference room;
    generate data representing a spatial relationship between each of the plurality of display devices and the camera based on the detected audio by determining azimuth and elevation angles between the camera and each of the plurality of display devices; and
    assign one or more video sources of an incoming video feed from a remote conference room to corresponding ones of the plurality of display devices based on the data representing the spatial relationship and content of the one or more video sources.

14. The non-transitory computer readable storage media of claim 13, wherein the instructions are further operable to:
determine, based on the determined azimuth and elevation angles, at least one of: a first probability that the camera is disposed above one of the display devices, a second probability that the camera is disposed below one of the display devices, a third probability that the camera is disposed right of one of the display devices, and a fourth probability that the camera is disposed left of one of the display devices.

15. The non-transitory computer readable storage media of claim 14, wherein the instructions are further operable to:
determine a spatial relationship value by determining which of the first probability, the second probability, the third probability, and the fourth probability contains a largest probability value.

16. The non-transitory computer readable storage media of claim 15, wherein the instructions are further operable to:
assign a video source of the incoming video feed to be displayed on a top side of a screen, a bottom side of the screen, a right side of the screen, or a left side of the screen of one of the display devices based on the spatial relationship value.

17. The non-transitory computer readable storage media of claim 13, wherein the instructions are further operable to:
determine, from the detected audio of each of the one or more loudspeakers, whether each of the one or more loudspeakers is within a predetermined distance from the microphone array.

18. The method of claim 1, wherein the incoming video feed and the content are displayed simultaneously on a display device of the plurality of display devices.

19. The apparatus of claim 7, wherein the incoming video feed and the content are displayed simultaneously on a display device of the plurality of display devices.

20. The non-transitory computer readable storage media of claim 13, wherein the incoming video feed and the content are displayed simultaneously on a display device of the plurality of display devices.

* * * * *